(12) United States Patent
Perin, Jr. et al.

(10) Patent No.: US 6,356,794 B1
(45) Date of Patent: *Mar. 12, 2002

(54) ITEM DISPENSING SYSTEM NETWORK

(75) Inventors: Joseph C. Perin, Jr., Cincinnati; David G. Wagoner, Loveland, both of OH (US)

(73) Assignee: Interlott Technologies, Inc., Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/661,211

(22) Filed: Sep. 14, 2000

Related U.S. Application Data

(60) Continuation-in-part of application No. 09/513,408, filed on Feb. 25, 2000, which is a continuation-in-part of application No. 09/325,082, filed on Jun. 3, 1999, now Pat. No. 6,038,492, which is a division of application No. 09/039,073, filed on Mar. 13, 1998, now Pat. No. 5,943,241.

(60) Provisional application No. 60/225,148, filed on Aug. 14, 2000.

(51) Int. Cl.$^7$ ................................................ G05B 11/01
(52) U.S. Cl. ..................... 700/78; 700/244; 700/246; 705/21
(58) Field of Search ............................ 221/2, 7, 8, 232, 221/233, 235; 700/236, 78, 241, 242, 244; 705/21

(56) References Cited

U.S. PATENT DOCUMENTS

| | | |
|---|---|---|
| 1,979,613 A | 11/1934 | Goggins |
| 3,140,009 A | 7/1964 | Wallace |
| 3,892,948 A | 7/1975 | Constable |
| 4,186,381 A | 1/1980 | Fleischer et al. |
| 4,247,899 A | 1/1981 | Schiller et al. |
| 4,473,884 A | 9/1984 | Behl |
| 4,589,069 A | 5/1986 | Endo et al. |
| 4,654,799 A | 3/1987 | Ogaki et al. |
| 4,695,954 A | 9/1987 | Rose et al. |
| 4,785,969 A | 11/1988 | McLaughlin |
| 4,821,642 A | 4/1989 | Schafer |
| 4,847,764 A | 7/1989 | Halvorson |
| 4,858,806 A | 8/1989 | Schafer |
| 4,982,337 A | 1/1991 | Burr et al. |
| 4,995,507 A | 2/1991 | Schafer |
| D319,264 S | 8/1991 | Schafer |
| 5,100,038 A | 3/1992 | Schafer |
| 5,111,939 A | 5/1992 | Schafer |
| 5,128,862 A | 7/1992 | Mueller |
| D329,877 S | 9/1992 | Schafer |
| 5,207,368 A | 5/1993 | Wilfong, Jr. et al. |
| 5,229,749 A | 7/1993 | Yenglin |
| 5,399,005 A | 3/1995 | Schafer |
| 5,492,398 A | 2/1996 | Schafer |
| 5,663,887 A | 9/1997 | Warn et al. |
| 5,694,326 A | 12/1997 | Warn et al. |
| 5,761,071 A | 6/1998 | Bernstein et al. |
| 5,819,981 A | 10/1998 | Cox |
| 5,927,541 A | 7/1999 | Stoken et al. |
| 5,943,241 A | 8/1999 | Nichols et al. |
| 6,038,492 A | 3/2000 | Nichols et al. |

FOREIGN PATENT DOCUMENTS

| | | |
|---|---|---|
| WO | WO 99/46695 | 9/1999 |

*Primary Examiner*—Christopher P. Ellis
*Assistant Examiner*—Joe Dillon, Jr.
(74) *Attorney, Agent, or Firm*—Wood, Herron & Evans, L.L.P.

(57) ABSTRACT

An item dispensing system having an item dispenser, a controller and a fault store for storing fault thresholds and faults. A true state of a fault is stored in the fault store in response to an operating state of the item dispensing system being equal to the fault threshold, and an alarm is generated in response to the true state of the fault. The fault thresholds can represent operating states that normally lead to the item dispensing system going out of service, for example, a low dispenser inventory. The item dispensing system is connected to a communications link and a computer and the alarm is provided to the computer to facilitate a servicing of the item dispensing system. A method or operating such an item dispensing system and associated network is also provided.

16 Claims, 12 Drawing Sheets

ITEM DISPENSING SYSTEM NETWORK

This application is a continuation of a provisional application Ser. No. 60/225,148 filed Aug. 14, 2000 which is a continuation-in-part application of U.S. Ser. No. 09/513,408 filed on Feb. 25, 2000, for an Item Dispensing System; which is a continuation-in-part application of U.S. Ser. No. 09/325,082, filed Jun. 3, 1999, for an Item Dispensing System, now U.S. Pat. No. 6,038,492; which is a divisional application of U.S. Ser. No. 09/039,073, filed Mar. 13, 1998, for an Item Dispensing System, now U.S. Pat. No. 5,943,241.

FIELD OF THE INVENTION

This invention relates generally to the field of dispensing systems and more particularly, to an improved item dispensing system.

BACKGROUND OF THE INVENTION

State sponsored lotteries are a popular and accepted method of generating revenue in place of, or in addition to, taxes. One form of lottery uses instant lottery tickets on which number combinations are preprinted before distribution, thereby permitting the player to immediately view the ticket and know whether he/she is a winner. One system of distributing instant lottery tickets is entirely clerical with the tickets being stored in a drawer and counted out by hand. The clerk typically is responsible for keeping track of the number of tickets sold, making redemption payments and providing such sales and payout information to the state. The state then pays the store owner a commission or other monies due. Such a system has the disadvantages of being completely manual and requiring clerical assistance for the entire transaction. Further, the system has no significant security and is susceptible to shrinkage, that is, theft and accounting errors that result in lost revenue and tickets.

Another system for distributing instant lottery tickets is the individual ticket vending machine, which is a stand-alone, unattended automated ticket dispenser. The vending machine accepts the customer's cash or credit card payment and provides a selection of lottery tickets corresponding to the payment. The customer then makes various ticket selections having a value equaling the payment. The vending machine monitors the ticket selections and dispenses the lottery tickets selected by the customer. Such a vending machine has the advantages of not requiring the attention of a clerk, being very secure, and providing a high level of reporting by keeping track of how often the machine is accessed to be loaded and serviced, when and how much money is collected, when and which tickets have been selected, etc. The vending machine may also include a printer for printing reports of machine activity.

While the above vending machine has many advantages over the clerical method of distributing instant lottery tickets, it also has several shortcomings. For example, there are several error conditions which may arise in the normal course of machine operation that should be addressed in a timely manner. For example, the device collecting and counting cash received by the machine may become jammed or otherwise inoperable. The machine may collect and store an amount of cash that is in excess of a desired amount. While such machines have the capability of keeping track of the inventory of lottery tickets, each packet of lottery tickets has a unique identifying indicia, but there is no way of automatically tracking that indicia and hence, those specific tickets, in the automated ticket dispensing process. Further, the programmed control of the ticket dispensing system is constantly being improved; and in any ticket distribution system, there may be thousands of ticket dispensers. Thus, the process of manually providing updated software to each of the ticket dispensers is cumbersome, requires a significant maintenance labor force and relies on personnel who often have limited or no computer experience to properly install and test revisions to the operating software within the ticket dispenser.

Therefore, there is a need to provide a dispensing system that is easier to maintain and provides more information to a central control, so that a more reliable ticket dispensing operation is maintained.

SUMMARY OF THE INVENTION

The present invention provides an item dispensing system that automatically monitors and detects any desired operating conditions. The automation of such item dispensing system diagnosis provides a vastly improved service capability. The item dispensing system network of the present invention provides a distributed system that facilitates the processing, transmission and reporting of diagnostic information relating to the operation of all of the item dispensing systems in the network. The present invention is especially suitable for those installations in which an entity has an obligation of servicing the item dispensing systems.

Within the item dispensing system network of the present invention, each of the item dispensing systems automatically provides a servicing agent with alarms indicating that an item dispensing system has, or will shortly, go out of service. However, each of the item dispensing systems does not automatically provide the servicing agent with alarms if a respective item dispensing system detects a fault that will not lead to an imminent out of service condition. Thus, the item dispensing network of the present invention has the advantage of providing the entity responsible for service only the most important operational states, that is, an existing or imminent out of service condition, so that such entity can most efficiently deploy its service assets.

According to the principles of the present invention in accordance with one described embodiment, an item dispensing system has an item dispenser, a controller in electrical communications with the item dispenser and a fault store for storing fault thresholds and faults. In one aspect of that invention, the fault thresholds represent operating states of the item dispenser, and a true state of a fault is registered in the fault store in response to the operating conditions of the item dispensing system being equal one of the fault thresholds. A alarm is generated by the controller in response to the fault being registered.

In another embodiment, the invention provides an item dispensing system network having a communications link connected between a computer and the item dispensing system, whereby the alarm is transmitted to the item dispensing system.

In another embodiment of the invention, a method of dispensing items first provides an item dispensing system. A fault threshold is stored, and a fault is registered in response to an operating state of the item dispensing system being equal to the fault threshold. An alarm is generated in response to the fault. In an aspect of this embodiment of the invention, a current state of the fault is compared to a prior state of the fault, and a deterioration of the state of the state of the fault is detected. The alarm is then generated only in response to determining the deterioration of the state of the state of the fault.

The item dispensing system network of the present invention has great flexibility in monitoring the operating states of individual devices within each of the item dispensing systems in the network. First, the present invention has the ability to immediately transfer an alarm to the computer upon the occurrence of a fatal fault, that is, a fault indicating the item dispensing system is out of service. However alarms based on nonfatal faults is avoided, thereby minimizing the occurrence of nuisance alarms and the dispatching of service agents to item dispensing systems that are not out of service. Second, the item dispensing system network of the present invention has the capability of being able to independently tune the creation of faults and alarms for each of the devices within each of the item dispensing systems. Therefore, fault and alarm sensitivity can be adjusted to meet the unique requirements of each item dispensing system.

This capability allows nonfatal faults and alarms to be tuned so that operating states of devices within each item dispensing system which would normally lead to an out of service condition can be tracked. Thus, a potential out of service condition can be anticipated, and the item dispensing system can be serviced before its occurrence. This operation limits the number of alarms presented to the computer and substantially reduces the load of the computer when it is connected to a large number of item dispensing systems. By performing that function automatically, the user of the computer, who is often responsible for the maintenance of a large number of item dispensing systems, has a significantly less burden. With the above capability, the allocation of service agent assets can be accomplished more rationally, efficiently and cost effectively to the benefit of everyone.

These and other objects and advantages of the present invention will become more readily apparent during the following detailed description taken in conjunction with the drawings herein.

DETAILED DESCRIPTION OF THE INVENTION

Figure 1:
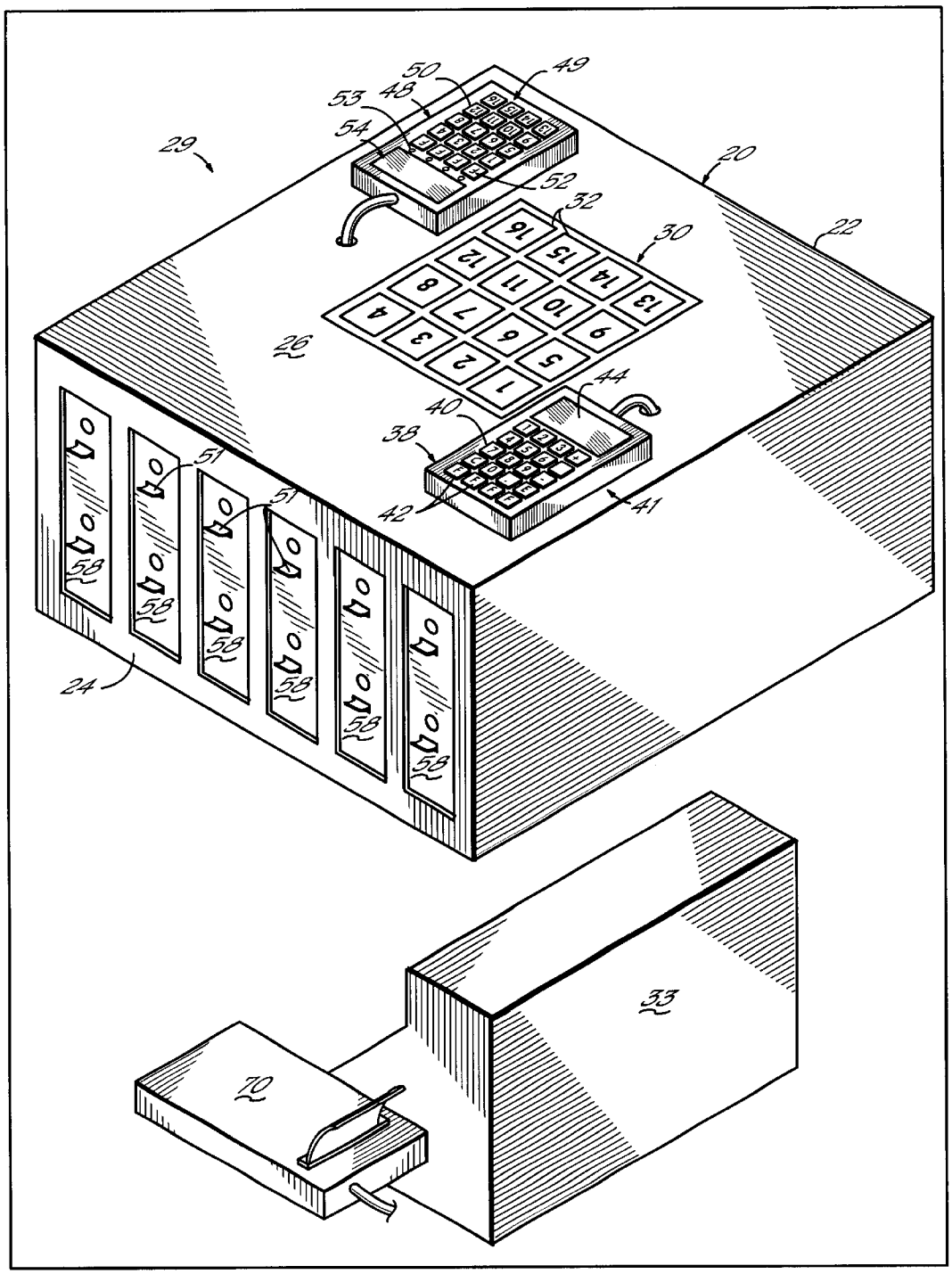
FIG. 1 is a partial perspective view of a counter having a ticket dispensing system in accordance with the principles of the present invention.

Referring to FIG. 1, a counter 20, for example, a point-of-sale retail checkout counter, has a customer side 22 and a retailer or clerk side 24. The counter 20 has an upper surface 26, which is normally a working surface on which items to be purchased are normally placed. In addition, point-of-sale displays and other items (not shown) are often placed on the working surface 26. A clerk standing on the retailer side 24 of the counter 20, scans or otherwise enters the items and their prices into a retailer point-of-sale terminal 33 and accepts the customer's payment for the goods by credit card or cash. In accordance with the present invention, an item dispensing system 29 is integrated into the counter 20. In the example to follow, the item dispensing system will be described as a gaming ticket dispensing system; however, as will be appreciated, the disclosed dispensing system may be used to dispense many different items that can be compactly stored in bulk, for example, other types of tickets, phone cards, stamps, cards or any other items capable of being relatively compactly inventoried and automatically dispensed.

A game display panel 30 is located on and normally removably attached to, the upper surface 26. The panel 30 has a predetermined number, for example, sixteen samples of game tickets 32, for example, instant lottery tickets displayed for view by the customer. The game ticket samples 32 are normally presented in the panel 30 in an attractive, easy to read display (such as in arrayed locations 1 through 16 shown in FIG. 1, as an example) so that the tickets catch the eye of the customer and clearly identify the game and its value.

If a customer desires to purchase game tickets, the customer pays the clerk with cash or credit card. The amount of the ticket purchase is entered by the clerk into the retailer terminal 33 and a retailer access module ("RAM") or unit 38. The retailer unit 38 is a self contained, stand-alone unit located at a first location with respect to the POS counter 20, for example, in the proximity of the retailer side 24 of the counter 20. The module 38 has an alphanumeric display 44 and an input device 41, for example, a keypad, with assorted numeric keys 40 and a selection of function keys 42 to facilitate the transaction. Upon entering the amount of the transaction in the module 38, the retailer module 38, in electrical communications with a customer access module ("CAM") or unit 48, transmits the payment value, that is, an available credit amount, to the customer module 48. The customer module 48 is a self contained, stand-alone unit located at a second location with respect to the POS counter 20 different from the first location. The customer module 48 is normally located proximate the customer side 22 of the counter 20 in a position convenient to the customer. The module 48 has an alphanumeric display 54 and an input device 49, for example, a keypad, with a number of numeric keys 50 corresponding to the number of displayed games 32 and nonnumeric function keys 52. Each of the numeric keys has an LED 53 next to the key, and illumination of the LED indicates that the game associated with that key may be played. Upon the available credit being displayed in display 54, utilizing the numeric keys 50, the customer selects the desired game tickets corresponding to the displayed game tickets 32. As each selection is made, one or more items or tickets 51 are dispensed from item or ticket dispensers 58 located at a third location with respect to the POS counter 20. The ticket dispensers 58 are normally located below the upper surface 26 of the counter 20 and oriented so that the tickets are dispensed toward the retailer side 24 of the counter 20. Thus, the dispensers 58 are normally located at a third location with respect to the counter 20 that is different from the first and second locations. After the tickets are dispensed, the remaining customer credit, that is, the amount of the purchase less the value of the item selected, is displayed in both the display 44 of the retailer module 38 and the display 54 of the customer module 48. Therefore, the customer can easily determine how many more tickets may be selected to equal the available credit. After all the tickets have been selected, the clerk then collects the dispensed tickets 51 from the dispensers 58 and gives the tickets 51 to the customer.

Figure 2:
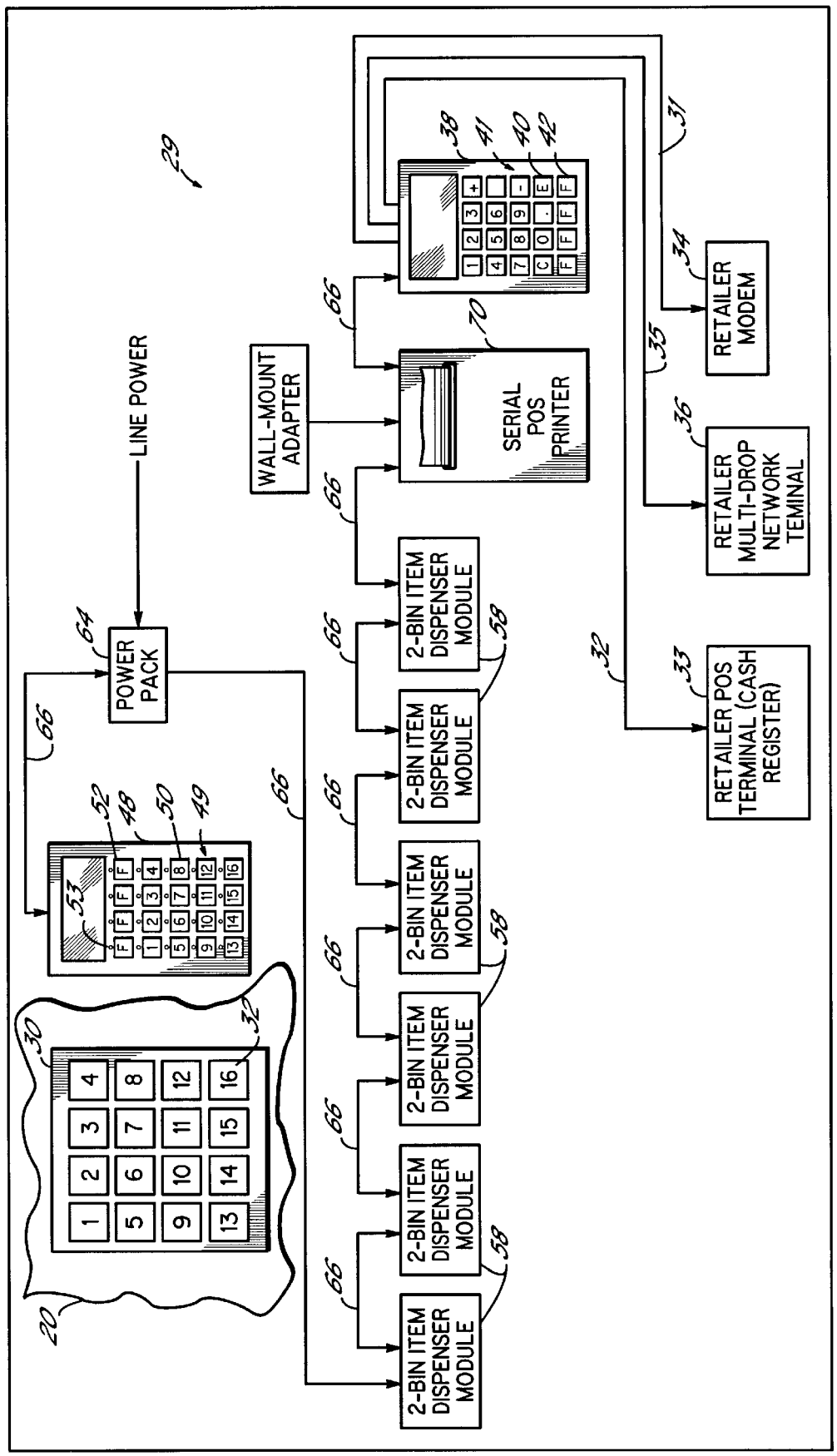
FIG. 2 is a schematic block diagram of the components of the ticket dispensing system illustrated in FIG. 1.

FIG. 2 is a schematic block diagram of the ticket dispensing system 29 illustrated in part in FIG. 1. Power is provided to the retailer and customer modules 38, 48, respectively, and the ticket dispensers 58 by a power supply 64. The power supply is designed to be connected to an AC power outlet normally found in retail establishments. Power is transferred to, and data is transferred between, the various components of the dispensing system 29 by means of cables 66, each of the cables 66 having eight conductors. The access modules 38, 48, ticket dispensers 58 as well as other components, for example, a serial POS printer 70, have pass through ports; and therefore, the cables may interconnect the components in a daisy chain manner, thereby providing complete modularity and scalability. With such a daisy chain architecture, any number of ticket dispensers 58 from one to the design maximum number, for example, 16, may be connected to the dispensing system 29 using the cables 66.

The power supply 64 provides an output DC voltage, for example, +15 VDC, which is supplied on two conductors of the eight conductor cables 66. One of the +15 VDC conductors is combined with a ground to form a first twisted pair. One conductor provides a serial data line and is combined with a ground to form a second twisted pair. Another conductor provides a serial clock line and is in a third twisted pair with a ground. The eighth wire is used to provide a signal from the item dispensers 58 to the retail module 38 and is in a fourth twisted pair with the other +15 VDC line. For example, the dispensers 58 may provide a signal over the eighth wire indicating that a dispenser drawer or door is opened. Data is transferred across the cables 66 using a two wire "$I^2C$-BUS" protocol from Phillips Semiconductors which is commercially available from Arrow Electronics of Centerville, Ohio. The "$I^2C$-BUS" is a widely used, highly flexible and cost effective serial protocol that is often used in consumer electronics equipment and has been used in point-of-sale terminals. Under the protocol, data is transferred in packets between the retailer module 38 and customer module 48 and the item dispensers 58. Data packet transfer occurs in response to commands and requests initiated by the retailer module 38.

Even though the retailer module 38, customer module 48 and item dispensers 58 all have self-contained microprocessors, the retailer module 38 is the master control for the ticket dispensing system 29. The retailer module 38 provides initialization to the customer module 48 upon power up and further, provides ticket prices, ticket inventory and purchase amount to the customer module 48. Further, the retailer module 38 receives information relating to which keys the customer has pushed and provides instructions to the dispensers to dispense an appropriate number or selection of tickets.

Normally, the item dispenser modules 58 include two separate storage and bursting mechanisms, that is, ticket dispensing mechanisms; and therefore, the illustrated six item dispensers 58 provide the capability of dispensing tickets for twelve games. The ticket dispensers are substantially as described in U.S. Pat. No. 4,982,337 and PCT Application Ser. No. PCT/US97/0576, each of which is assigned to the assignee of the present invention, and the entirety of both applications is incorporated by reference herein.

Figure 3:
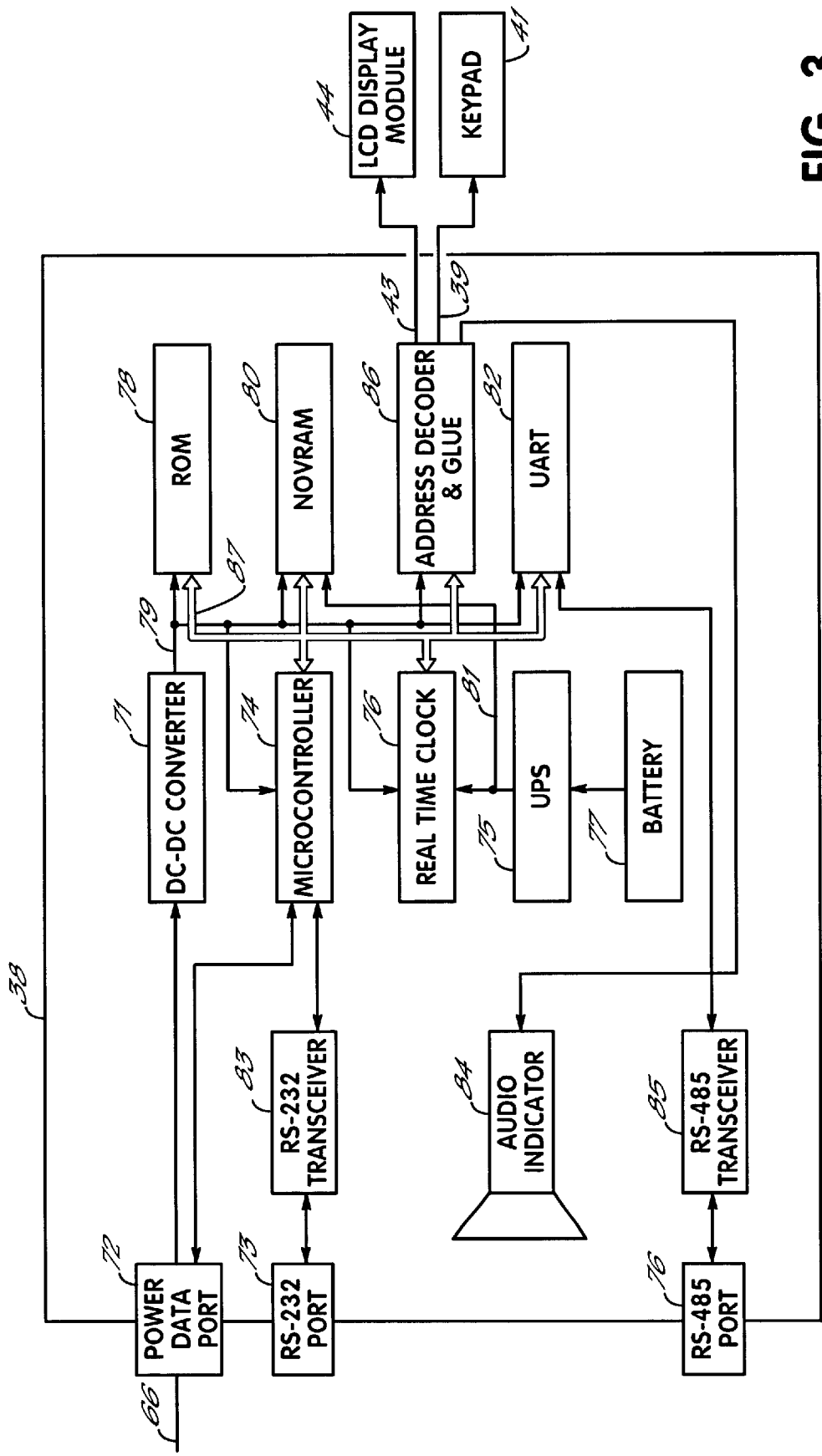
FIG. 3 is a detailed schematic diagram of a retailer access module in accordance with the principles of the present invention.

Referring to FIG. 3, the retailer access module 38 has a power/data port 72 connected to a cable 66, and RS-232 port 73 and an RS-485 port 76. The power conductors from the cable 66 are connected to a DC-DC converter 78. The DC-DC converter 78 has a first function of stepping down the +15 VDC to a lower level, for example, +5 VDC, with the appropriate regulation which is supplied to various components on power line 79. The power supply 64 of FIG. 2 provides the higher +15 VDC level across the cables 66 to reduce the current flow within the cables 66.

The retailer module 38 further includes a microprocessor 74, for example, Model No. 80C652 manufactured by Phillips Semiconductor and commercially available from Arrow Electronics of Centerville, Ohio. In addition, the module 38 includes a realtime clock 76, read-only memory ("ROM") 78, non-volatile random access memory ("NOVRAM") 80, a universal asynchronous receiver/transmitter ("UART") 82, an RS-232 transceiver 83, an RS-485 transceiver 85 and an audio indicator or speaker 84. The realtime clock 76 provides data and time information that is associated with a history of ticket sales. Thus, the ticket sales can be analyzed in reports by shift, by day, by week, etc. The retailer module 38 is electrically connected to the LCD display module 44 having two rows of 16 characters of display. An uninterruptable power supply 75 has a battery backup 77 and provides a continuous source of power on line 81 to the realtime clock 76 and the NOVRAM 80.

The retailer module 38 is also connected to the keypad 41 which includes 5 rows of keys 40 (FIG. 1) four columns wide that operate as 16 numeric keys and 4 nonnumeric function keys 42. An address decoder and glue circuit 86 receives input data on line 39 from the keypad 41 and provides output data on line 43 to the LCD display 44. The decoder and glue circuit 86 is a collection of digital and analog logic and interface circuitry that handles I/O functions to permit the microprocessor 74 to respond to and operate the display 44, keypad 41 and speaker 84. For example, the circuitry 86 decodes keystrokes from the keypad 41 into binary data that may be processed by the microcontroller 74. Further, the decoder circuit 86 receives binary data representing information to be displayed and converts that data to output signals that are appropriate for the LCD display 44. The decoder circuit 86 is also effective to provide audio output signals to the audio indicator or speaker 84, as required. The circuit 86 may be implemented using 7400 Series logic from Philips Semiconductor, Inc. The controller 74, ROM 78, NOVRAM 80, address decoder 86 and UART 82 are interconnected by address, data and control buses 87 in a known manner. In addition, the realtime clock 76 is also connected to the data and control buses.

Figure 4:
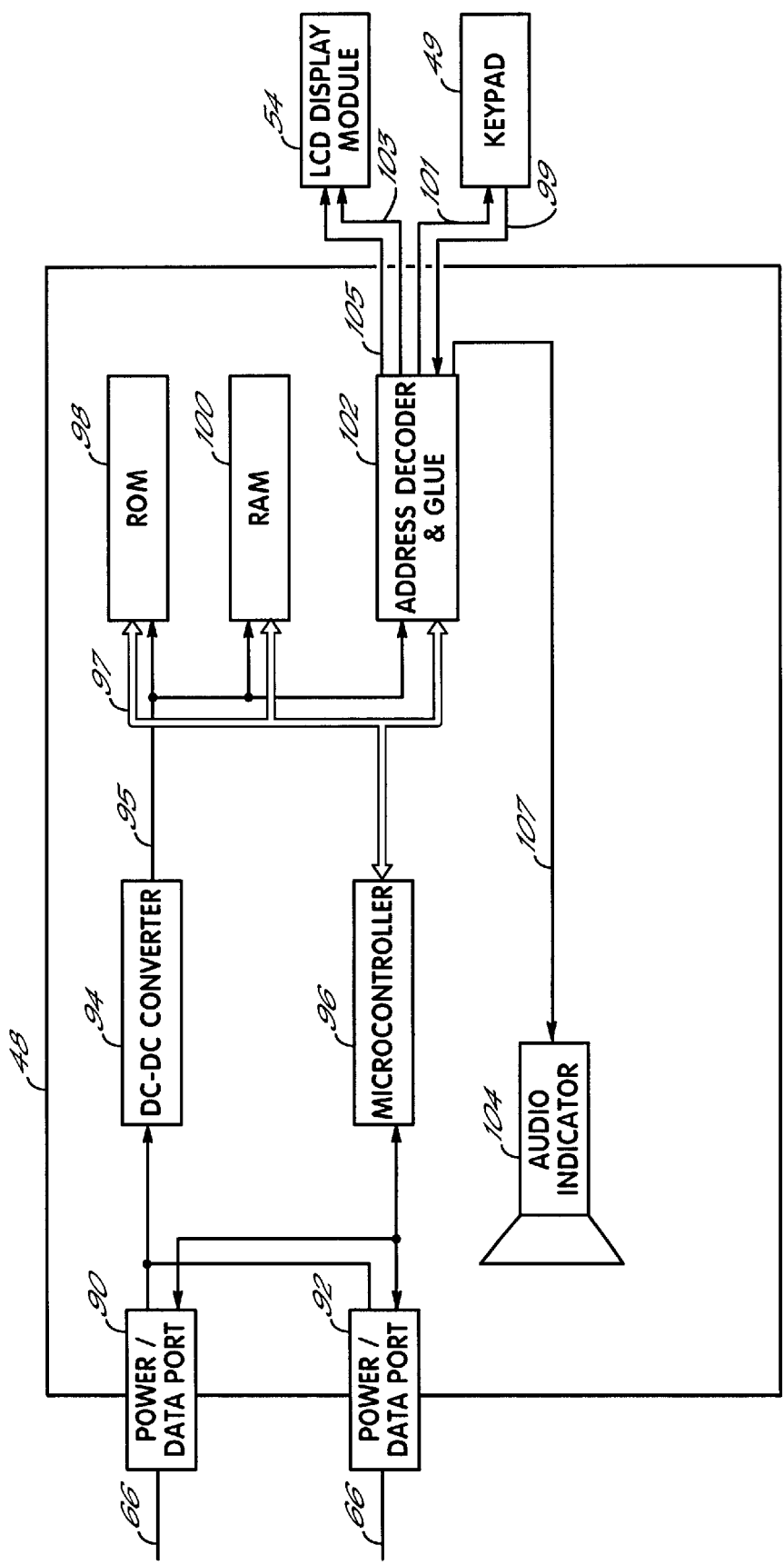
FIG. 4 is a detailed schematic diagram of a customer access module in accordance with the principles of the present invention.

Referring to FIG. 4, the customer access module 48 has a pair of pass-through power/data ports 90, 92 which are connected to the cables 66. A DC-DC converter 94 functions identically to the converter 71 of FIG. 3 and steps down the +15 VDC from the power supply 64 to +5 VDC. The +5 VDC is provided to the module components on power line 95. The customer module 48 includes a microcontroller 96 identical to the microcontroller 74 of the retailer module 38, ROM 98, RAM 100 and an address decoder and glue circuit 102. The microprocessor 96, ROM 98, RAM 100 and decoder circuit 102 are interconnected by address, data and control buses 97 in a known manner. The address decoder and glue circuit 102 handles the I/O functions associated with providing outputs to and receiving inputs from the display 54, keypad 49 and speaker 104. For example, the circuit 102 receives inputs on line 99 from a keypad 49 containing a 5 row by 4 column matrix of keys that provides 16 game keys 50 and 4 function keys 52. The decoder and glue circuitry 102 further provides output signals on line 101 to drive LEDs 53 associated with the keys on the keypad 49. In addition, the decoder and glue circuitry provides data on line 103 to the LCD display module 54 which is a 2 line by 16 character display. The decoder and glue circuitry 102 further provides power on line 105 to drive the illumination for backlighting the LCD display 54 and audio signals on line 107 to the audio indicator or speaker 104.

The retailer module 38, customer module 48 and ticket dispensers 58 are distributed in three different locations with respect to the counter 20; and the retailer module 38 and customer module 48 are being operated by different persons at different times. However, it is necessary that the process of purchasing game tickets, selecting game tickets and dispensing game tickets be carried out in a coordinated manner, which means under a central control. In the ticket dispensing system 29, the retailer module 38 is the master controller of the system. Since the retailer and customer modules 38, 48 are together performing most, if not all, of the same tasks that are currently being performed by integrated stand-alone ticket dispensers, the normal operation of the system will be described to the extent that the nature of the operations of the retailer and customer modules will be understood. It is not believed necessary to describe in detail every operation of the modules 38, 48 for one of ordinary skill to understand the present invention.

Figure 5:
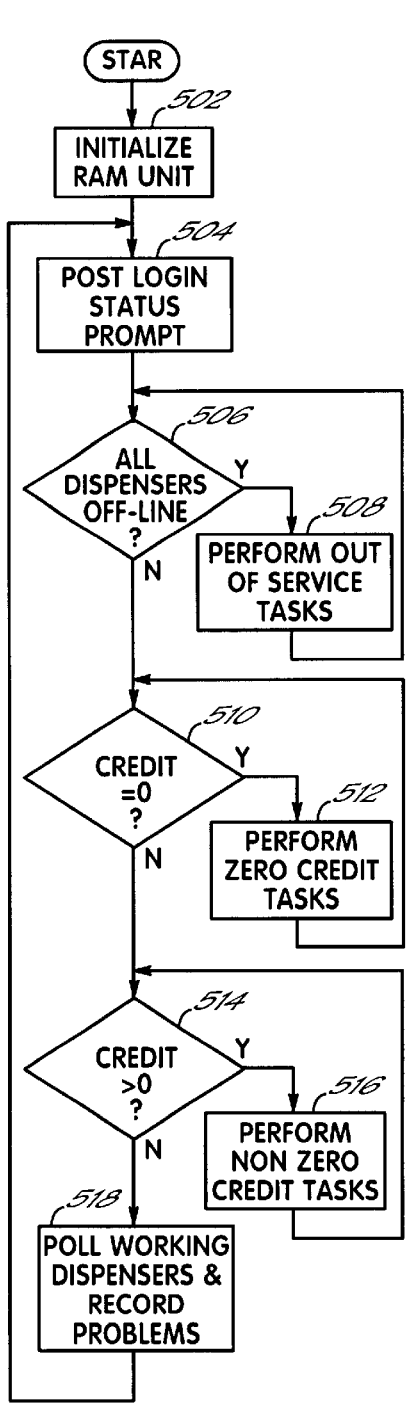
FIG. 5 is a flow chart illustrating an item dispensing portion of the operation of the retailer access module in accordance with the principles of the present invention.

In use, the first operation is to apply power to the system. Referring to FIGS. 3 and 5, when power is supplied to the ticket dispensing system 29, the retailer access module 38 at 502 performs a self-initialization as well as providing data for initializing other components. More specifically, the microcontroller 74 initializes or provides default values for all of the boards and components within the retailer module 38. Further, the microcontroller 74 establishes communications links over the cables 66 to the ticket dispensers 58 and customer module 48; and in the process, provides initialization and default values to those units. Utilizing the "I²C-BUS" serial data protocol, the microprocessor 74 fabricates packets of data and transfers them to, and receives packets of data from, the customer module 38 and the ticket dispensers 58. The composition and transfer of the data packets is in accordance with the "I²C-BUS" protocol. Therefore, on a regular basis, the microprocessor 74 is sending a data packet to the customer module 48 that either provides information to, or requests status information from, the customer module 48. The initialization step 502 tests other components in the system, for example, the motors within the ticket dispensers 58.

Figure 6:
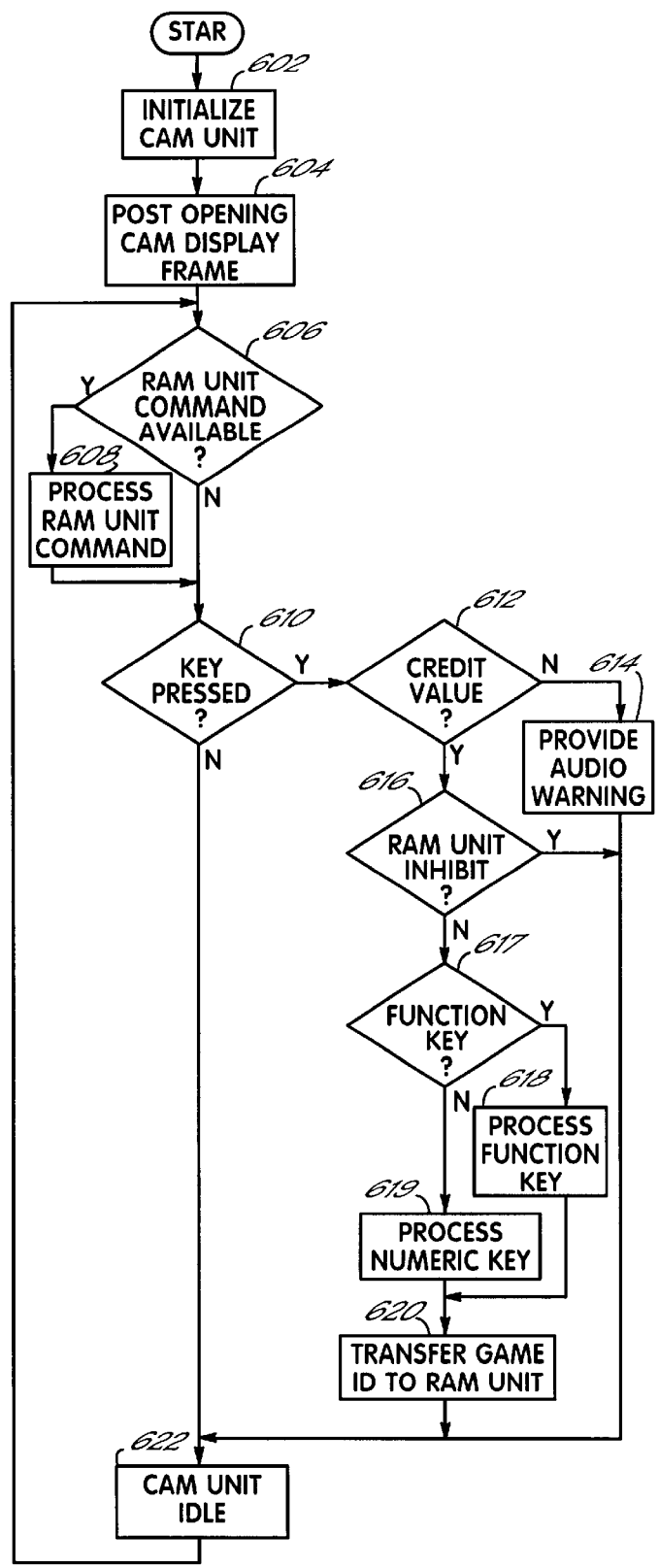
FIG. 6 is a flow chart illustrating an item dispensing portion of the operation of the customer access module in accordance with the principles of the present invention.

Referring to FIGS. 4 and 6, upon power being applied to the customer module 48, the microcontroller 96 at 602 establishes default values and otherwise initializes serial ports 90, 92, the LCD display 54 and the LED's on the keypad 49. Then at 604, the processor 96 instructs the address decoder and glue circuitry 102 to transfer an opening display frame to the LCD display module of 54. The opening message is normally a technical identification of the module 48 and provides no game related information to the customer. The microprocessor 96 takes no further action until it receives a command from the retailer module 38 as detected at 606. The processor 96 then proceeds to process the command at 608. The command from the retailer module 38 may be a part of an initialization sequence, a status request, or information with respect to ticket pricing and inventory, etc. After the first command is successfully received from the retailer module 38 and the communications link has been successfully established, the system is considered to be online and operational. At that point, the processor 96 commands the circuitry 102 to provide another message to the display 54, for example, "Play the Lottery". The customer module 48 then simply idles awaiting further commands from the retailer module 38.

Referring back to FIG. 5, after the initialization is complete, the process at 504 awaits a login by a user. The retailer access module 38 has three different levels of password security, and the different levels of security require particular or unique password configurations. In addition, the different levels of security provide different levels of access to the ticket dispensing system, for example, a clerk normally has the lowest level of security and would be able to use the system to login and logout, enter credit values, that is, customer purchase values, and print some reports. A manager or system supervisor normally has a higher level of security and correspondingly greater access to the system and, for example, may, in addition to the clerk's functions, be able to load and enter inventory and collect reports. The highest level of security providing the greatest access to the ticket dispensing system is normally reserved for service agents who have the requirement and ability to run test routines and perform system diagnostics.

Assume for purposes of this example, that a retail clerk has logged into the system at process step 504. The microprocessor 74 then at 506 checks whether all of the dispensers are off line. If any one ticket dispenser 58 continues to be online, then game ticket sales may continue. If no dispensers are online, then the microprocessor 74 moves to execute the out of service tasks at process step 508. All of the ticket dispensers 58 may be offline because no tickets are loaded, the system is undergoing maintenance, a cable 66 is broken, etc. The principal out of service task of the processor 74 is to detect when the realtime clock 76 rolls over to the next day, that is, past 12:00 a.m. When a new day starts, several accounting tasks must be performed, for example, the accounting data stored in the NOVRAM 80 must be shifted back one day. For example, the reports may be selected as being related to the current date, for example, yesterday's report, last weeks report, etc. Therefore, when the realtime clock rolls over to a new date, the accounting data associated with today must be assigned to yesterday, and after Saturday midnight, this week's data is now considered to be last week's data, etc. The microprocessor 74 continues to perform the out of service tasks at 508 until at least one item dispenser 58 is brought online.

When the microprocessor 74 detects that at least one dispenser is online, the processor then checks at 510 to determine whether the current credit value is zero. In the zero credit state, the ticket dispensing system 29 is available to sell tickets, but there is no current sales activity. This state is the normal idle state for the system. If the credit is determined to be zero, the microprocessor at 512 then performs the zero credit tasks. Such tasks include checking for the entry of a password, checking for the entry of a credit and, again checking the realtime clock for a date rollover, If the processor 74 detects that a credit has been entered, the process at 514 then moves to execute the nonzero credit tasks at 516.

Figure 7:
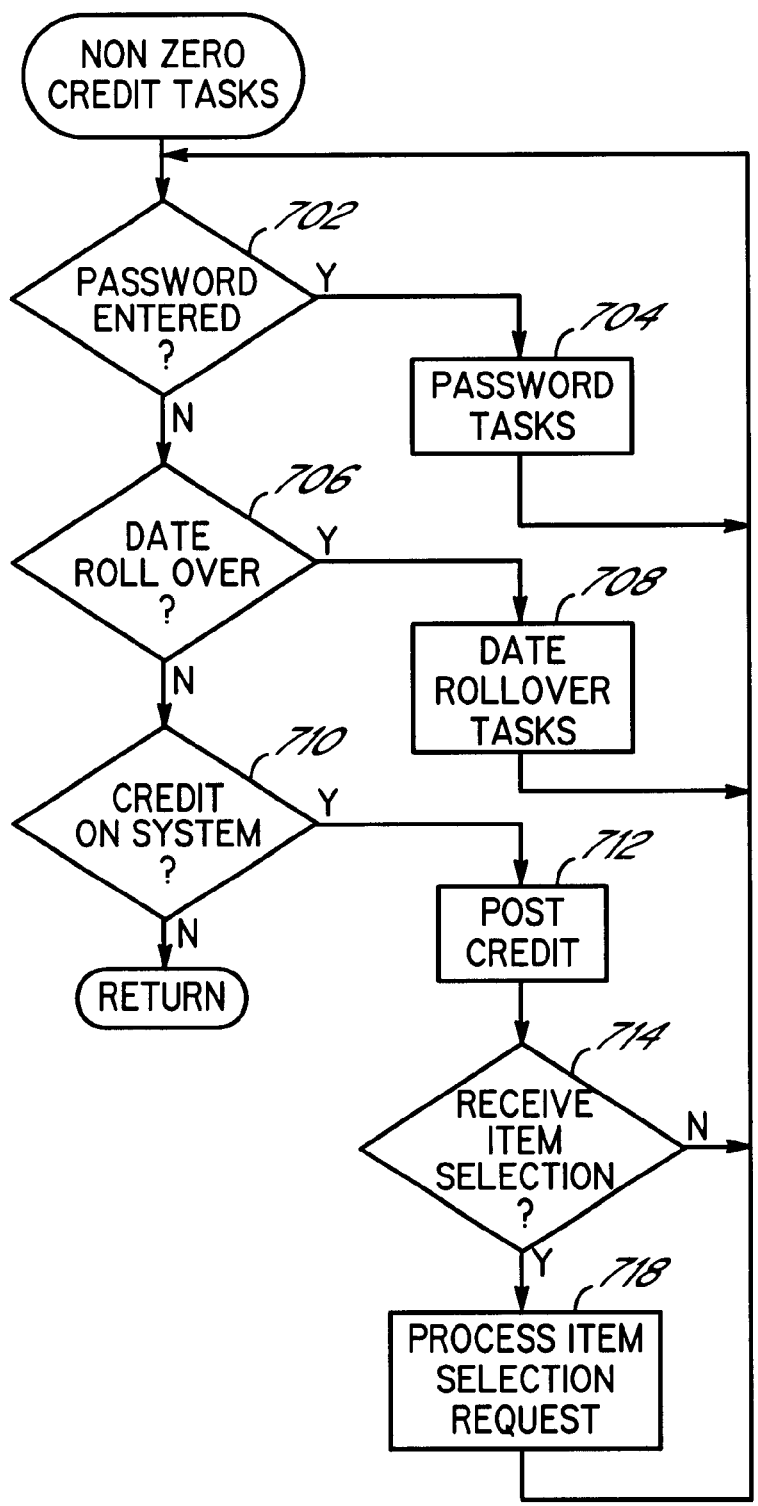
FIG. 7 is a flow chart illustrating an item dispensing portion of the operation of the retailer access module in more detail.

The major nonzero credit tasks are set forth in the flow chart of FIG. 7. As previously described, the processor at 702 detects whether another password has been entered. If so, the processor 74 then executes password tasks at 704. If not, the processor again tests at 706 whether the realtime clock has experienced a date roll over. If so, the date roll over tasks as previously described are executed at 708. If there has been no date roll over, the processor 74 determines at 710 whether there is any credit on the system, that is, whether the clerk has entered into the retailer access module 38, a credit amount equal to a payment made by a customer to purchase tickets. If a credit value is detected, the microprocessor 74 in the retailer module 38 then posts the credit at 712. In posting the credit, the microprocessor 74 enters the credit value in the NOVRAM 80 and causes the decoder and glue circuit 86 to provide an output to the display module 44 to display the credit value to the retail clerk.

In addition, the microprocessor 74 prepares a data packet including the credit value which is transferred over the cables 66. Referring to FIG. 6, the customer module receives the data packet; and at 606, the processor 96 detects the presence of the credit value transferred by the retailer module 38. The processor 96 then instructs the circuitry 102 to provide the credit value to the display 54. Upon viewing the credit amount in the display 54 of the customer module 48, the customer then knows to begin the selection of game tickets, the total value of which is to equal the displayed credit value. The customer module 48 detects at 610 whether one of the numeric keys 50 or one of the function keys 52 on the keypad 49 is being pressed by the customer. If a key actuation is detected the processor 96 then at 612 checks whether a credit value exists. If one of the game keys 50 is pressed, but the retailer module 38 has not provided the customer module 48 with a credit amount, the keystroke cannot be accepted. In this situation, the processor 96 at 614 causes the address decoder and glue circuitry 102 to provide a signal to the audio indicator 104 which, in turn, produces an audio warning tone or beep.

If a credit value exists, the processor 96 at 616 determines whether the retailer module has transmitted an inhibit command to the customer module 48. If the retailer module 38 is processing a previous keystroke from the customer module 48; and the successful processing of the keystroke depends on the operation of another device, for example, the ticket dispenser 58, the system cannot accept any additional game selections from the customer until the previous selection has been successfully processed. Therefore, immediately upon receiving a keystroke from the customer module of 48, the retailer module 38 transmits a data packet including an inhibit command back to the customer module of 48. When the retailer module 38 receives an acknowledgment from the ticket dispensers 58 indicating that a dispense ticket command has been received, the retailer module 38 then transmits a cancel inhibit command to the customer module 48. The retailer module 38 will subsequently check for a successful ticket dispensing operation.

Upon receipt of the cancel inhibit command, microprocessor 96 at 617 then determines whether the pressed key is one of the function keys 52. If so, the processor 96 at 618 processes the function key. In this example, the processor 96 commands the circuitry 102 to provide a message to the display instructing the customer to press a numeric game key, for example, "Select a Game". The process then loops through the process just described with respect to process steps 606–616; and if, at 617, a function key is not detected, the processor 96 at 619 processes the numeric key. That processing is basically to decode and identify the item or game associated with the numeric key. Thereafter, the processor 96 at 620 transfers a data packet including that game identification to the retailer module 38 in response to the next status request received from its microprocessor 74. The processor 96 then updates the credit value for the customer module 48. In updating the credit value, the processor 96 subtracts the value of the selected game ticket from the original purchase value; and instructs the circuit 102 to display the updated credit in the display 54 for the customer. The customer module 48 then at 622 returns to its idle mode in which it manages the display frames. With a credit present and being displayed, the module 48 will normally not change the state of the display.

Knowing that a credit exists, the retailer module 38 next expects to receive a keystroke from the customer module 48 representing the identity of a particular game selected by the customer. If at 714, the processor 74 detects the receipt of a game identification, it then proceeds at 718 to process the game selection request. Under normal circumstances the microprocessor 74 prepares and sends a data packet with a dispense command to an appropriate one of the item dispensers 58, and also send an inhibit command data packet to the customer module 48. If the ticket is available, the one of the item dispensers 58 dispenses the ticket which makes it available to the retail clerk for collection and presentation to the customer. Any irregularity in the dispensing process, for example, a jam, is detected by the item dispenser 58 and a state signal representing that condition is transmitted over the cable 66 to the retailer module 38. In addition, upon receiving the dispense command, the item dispenser 58 sends an acknowledgment to the retailer unit 38.

In some situations, the ticket dispenser may be empty and that zero inventory condition is transmitted back to the microprocessor 74. The microprocessor 74 then prepares a data packet for the customer module 48 that includes a game offline command indicating the zero inventory condition. The game offline may also arise because the selected item dispenser 58 is down for maintenance or if there is a communication problem with the item dispenser 58. Referring to FIG. 6, the microprocessor 96 detects at 606 the receipt of the game offline command, and at 608, the command is processed. Upon receipt of the game offline command, the microprocessor 96 within the customer module 48 turns OFF the LED next to one of the keys 50 on the keypad 49 that is associated with the game that is offline. In addition, the microprocessor 96 causes the address decoder 102 to provide a message to the LCD display 54 that requests the customer to "Play Another Game". In addition, the microcontroller 96 will set a state variable within the customer access module 48 that will provide the same message to the customer for subsequent depressions of that same key. That state variable remains set until the microcontroller 96 receives a command from the retailer module 38 canceling the game offline command.

Returning to process step 718 of FIG. 7, when the retailer module 38 detects that the acknowledgment to the dispense command from the ticket dispenser 58, the processor 74 sends a release inhibit command to the customer module 48. The processor 74 then iterates through the nonzero credit tasks loop and checks for a password at 702, a date rollover at 706, and a credit on the system at 710. If the value of the game selection by the customer did not utilize all of the available credit, the processor 74 calculates the remaining credit, that is, the original credit less the value of the dispensed game ticket. At 512, the updated credit value is entered in the NOVRAM 80. The process of game ticket selection by the customer and ticket dispensing continues until the microprocessor 74 determines at 510 that the credit value is zero and then returns to the process illustrated in FIG. 4. The processor 74 then proceeds at 518 to poll the working item dispensers 58 and record any detected problems. The retailer and customer access modules 38, 48 continuously iterate through the processes illustrated in FIGS. 5–7 for as long as power is applied to the system. When the customer module 48 is idling at 622 of FIG. 6, the processor 96 normally causes the address decoder and glue circuitry 102 to transmit a message to the LCD display module 54 requesting the customer to "select function or game." However, if the credit is zero, the processor 96 causes the display 54 to scroll through a number of default messages. The microprocessor 96 continuously iterates through the process steps 706–714 as long as power is applied to the customer module of 48.

The above description assumed that the customer was selecting only numeric keys, however, the customer module 48 includes several function keys 52 which may be used in combination with the number keys to select the game tickets. For example, one of the function keys may be used to select a predetermined number, for example, 5, tickets. After pressing that function key, the customer is then prompted by the display 54 to press a numeric game key. Upon a game key being selected, the processor 96 then creates five game identification data packets that are then serially transmitted to the retailer module 38. Another function key may be set up to choose different preselected number, for example, 10 tickets. The third function key may be used to play all of the selected games. A fourth function key may also be utilized to randomly select the available games until the credit amount is satisfied. With each of the other function keys, after the function key is pressed, the customer then selects a game key; and the processor 96 provides game identity data packets that correspond to the function key that was selected.

To review a normal transaction, a customer at the check out counter 20, desiring to purchase game tickets, gives the cashier an amount of money equal to the purchase. The retail clerk then uses the keypad of 41 to enter the amount of the transaction, that is, the credit due the customer. The microcontroller 74 within the RAM 38 detects and identifies the keys pressed by the retail clerk, posts the amount of the credit in the NOVRAM 80, displays the credit value in the retailer module display 44 and transfers the credit value to the customer module of 48. The processor 96 within the customer module 48 displays the credit value.

If the microprocessor 74 of the retailer module 438 detects that any of the ticket dispensers are off-line or, that there is no inventory of tickets in some of the ticket dispensers, that information is stored in the NOVRAM 80; and in addition, a game off-line command is transmitted over the cable 66 to the customer module 48. The processor 96 detects a game off-line command and sets a state variable with respect to that game. In addition, the processor 96 commands the address decoder and glue circuitry 104 to turn OFF an LED 53 next to a key 50 in the keypad of 49 associated with the off-line game. Thus, the customer knows that the game is unavailable and that the key is inactive.

When the credit amount is displayed by the LCD display 54 to the customer, the customer knows that online games represented by the active keys may be selected. Upon pressing a key, the microcontroller 96 transmits the game identity to the retailer module 38, and the microcontroller 74 responds with an inhibit to the customer module 48. The processor 74 then proceeds to command the appropriate ticket dispenser to dispense the selected ticket; and upon receiving an acknowledgment to the dispense command, the processor 74 removes the inhibit from the customer module 48. Simultaneously, the microprocessor 74 recomputes the current credit value and posts the new credit value in the NOVRAM 80 as well as the retailer display 44. The processor 96 in the customer module 48 also computes an up-to-date credit value and displays the new credit value in the display 54. That process continues until the customer has selected a number of tickets that brings the credit value to zero. The retail clerk then collects the dispensed tickets from the dispensers 58 and provides the tickets to the customer.

The retailer access module 38 may also be used in association with the printer 70 to provide a wide variety of reports. The NOVRAM 80 within the module 38 maintains a complete history of ticket sales in terms of when they were sold, which game tickets were sold, the value of the game tickets, the clerk on duty, etc. Further, many reports of the history of sales can be provided, for example, sales by the shift by the day, or by the week, etc.

The item dispensing system 29 of the above described invention provides a distributed, modular and scalable item dispensing system that has many features making it especially suitable for point-of-sale counters. First, the present invention provides a game ticket purchase and dispensing system that is very automatic, very secure and has a high level of reporting. Thus, with the system automatically calculating the credit remaining, there should be no math mistakes. Further, the automatic dispensing should eliminate mistakes in accidentally dispensing too many tickets. With the tickets locked in their dispensers, ticket theft is minimized if not eliminated.

By making the retailer and customer modules 38, 48 and the dispensers 58 self contained, stand-alone units, the units can be located at the POS counter 20 at any convenient location. For example, the customer unit 48 may be placed on the top surface 26 of the counter 20, or the unit 48 may be placed on another support at the counter, for example, a shelf on, or next to, the counter 20. Further, the customer unit 48 may be picked up and viewed at close range as required by customers.

Similarly, the retailer module 38 may be placed on the surface 26 of the counter 20, or it may be placed on another support at the counter 20 or adjacent the POS terminal, for example, a shelf on or next to the counter 20 or cash register. In addition, the modularity of the retailer module 38 permits it to be connected directly to a retailer POS terminal 33 FIG. 2) or its functions to be integrated within the retailer POS terminal.

The stand-alone modular construction further permits a high degree of scalability. That is, a different number of dispensers can be easily added and removed from the system 29 to accommodate different numbers of items to be sold and dispensed. The only practical limitation is the maximum number of dispensers established by the system design which is a matter of design choice. In addition, the item dispensers 58 may be readily located at any convenient location. While it is generally considered most convenient to have the item dispensers 58 at the counter 20, they do not have to be in the proximity of the counter 20. Further, each of the item dispensers 58 may be placed in different locations at the convenience of the user.

The item dispensing system 29 of the present invention has a significant advantage in that by placing the system at the POS counter, the items to be sold are exposed to substantially more potential customers than is possible with existing systems. Thus, it is expected that significantly greater sales will be made.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, the serial POS printer 70 is described as having pass through ports and connected to the cables 66. However, if the POS printer 70 does not have pass through ports, it may be connected to the retailer module 38 using an RS-232 serial link. In addition, the "I²C-BUS" communications protocol is used to transfer data over the cables 66; however, again, other communications protocols, for example, "CANBUS", "ESCHLON" or proprietary protocols may be used.

Further, the ticket dispensing system as described above is not interconnected with the retail POS terminal, and all communications between the ticket dispensing system and the retail system, for example, the amount of the purchase, must be entered by a retail person in both the retailer module 38 and the retailer POS cash register 33. As will be appreciated, referring to FIG. 2, the retailer access module 38 may be connected by RS-232 lines 31, 32 to the retailer POS cash register or terminal 33 and a retailer modem 34. Similarly, the retailer access module 38 may be connected by an RS-485 line 35 to a retailer multidrop network terminal 36. With the retailer module 38 in communication with the cash register 33, the amount of the purchase only has to be entered once. In addition, with that and the other communications connections mentioned above, the inventory and sales data stored in the NOVRAM 80 can be integrated into the retailer's reporting system. Further, as will be appreciated, the whole function of the retailer access module 38 may be integrated into the retailer POS terminal 33; and in that embodiment, the retail module 38 will not exist as a separate unit.

The system disclosed in FIGS. 1 and 2 provide a passive display panel 30 and a separate customer unit 48 having a number of keys corresponding to the games presented in the display unit 30. As will be appreciated, the displays in the panel 30 can be individually made active, so that they respond to actions by the customer in selecting a game. In that embodiment, the display panel has the same capabilities as the numeric keys 50. In addition, and in a similar manner, the function keys 52 may also be integrated into the display panel 30. As will be appreciated, the components of the item dispensing system 29 may installed in an existing counter, or alternatively, the components may be installed in a counter module that is a complete dispensing system and installed as a complete POS counter unit. In a further embodiment, the passive display 30 need not be used, and instead, the items are displayed and selected using only the keys 50 of the customer module 48.

Even though the item dispensing system 29 has a substantial ticket inventory and sales reporting capability, if the retailer has a number of item dispensing systems, those reports must be manually collected from each of the machines which is labor intensive, time consuming and expensive. In addition, retailers are required to provide those reports to a central administrative agency, for example, a state lottery commission, which again is labor intensive, expensive and subject to error caused by misplaced or lost reports, etc. Further, each of the item dispensing systems must be serviced on an individual basis. For example, password lists which are replicated in each of the dispensers must be properly maintained to provide for new, modified and deleted entries. Such a task, done repeatedly for each individual machine or system of item dispensers is labor intensive, tedious and expensive.

Figure 8:
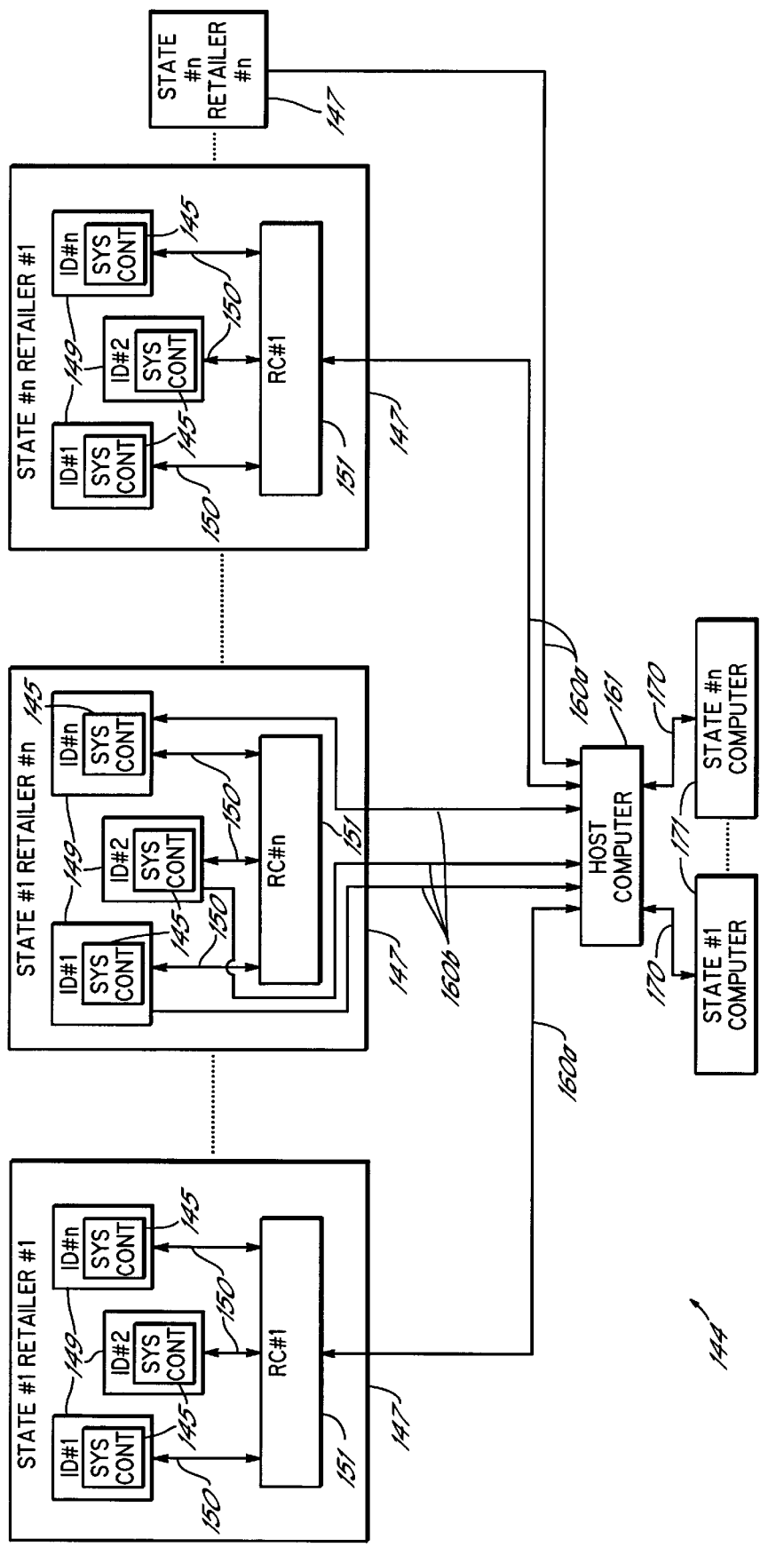
FIG. 8 is a schematic block diagram of another embodiment of the invention that facilitates a reporting function with respect to the item dispenser in accordance with the principles of the present invention.

A more efficient, automatic and timely reporting capability is provided by a further embodiment of the invention as illustrated in FIG. 8. Item dispensing machines or systems 149 are often supplied by a vendor via a commercial sale or lease to a client or customer of the vendor, for example, a state authority. The client then provides the item dispensing systems 149 to different retail locations 147 that are collectively associated with that client. The vendor may have item dispensing systems for many different items that can be compactly stored in bulk, for example, lottery tickets or other types of tickets, phone cards, stamps, cards or any other items capable of being relatively compactly inventoried and automatically dispensed. Thus, for purposes of this description, a client of the vendor is any entity that uses a group of the vendor's item dispensing systems for dispensing items, and the described distribution of lottery ticket dispensers by a state authority to retailer locations within the state is only one example of a client and an item dispensing system.

In the transaction between the vendor of the item dispensing systems 149 and its client, the vendor may contract with its client, for example, the state authority, to maintain and service the item dispensing systems 149 at the various retailer locations 147. Further, such a service contract may exist with different clients, for example, different state authorities, State#1 . . . State#n. In this embodiment, to facilitate that service obligation, the vendor establishes a wired or wireless bidirectional communications link 160 between a host computer 161 under the control of the vendor and the item dispensing systems 149, at the various retailer locations 147 associated with different clients, for example, different states, State#1 . . . State#n. Further, in this embodiment, a bidirectional communications link 170 is also established between the vendor's host computer 161 and client computers 171, for example, computers that are used or controlled by a client such as one or more state authorities, State#1 Computer . . . State#n Computer. Thus, with such communications links, the host computer 161 is able to remotely collect data and alarm conditions from the various item dispensing systems 149 as well as pass on data from various state computers 171 to appropriate ones of the of the item dispensing systems 149. Thus, the devices of FIG. 8 function collectively as an item dispensing system network or a remote data and alarm collection ("RDAC") network 144.

In the description herein, host computer 161 is described as being a computer used by a vendor of the item dispensing systems 149. Further, the state computers 171 are described as being computers used by clients of a vendor of the item dispensing systems 149; however, as will be appreciated, those commercial relationships are illustrative and are not to be considered a limitation on the scope of the invention. The host computer as recited in the claims can be any computer, for example, computer 161, that exchanges alarms and/or other data with item dispensing systems 149 regardless of the commercial relationship of the user of the host computer 161 to the vendor of the item dispensing systems 149. Further, the client computer as recited in the claims can be any computer, for example, computer 151 that exchanges alarms and/or other data relating to the item dispensing systems 149 with the host computer 161 regardless of the commercial relationship of the user of the client computer to the vendor of the item dispensing systems.

In the specific example illustrated in FIG. 8, in a first state, for example, State #1, a plurality of retail locations 147, for example, Retailer #1 . . . Retailer #n, each have a plurality of item dispensing systems 149, for example, ID #1 . . . ID #n. The item dispensing systems 149 may be the item dispensing systems 29 (FIG. 1) described earlier herein, a clerk facilitated item dispensing unit such as that described in U.S. Pat. No. 4,982,337, a stand-alone item dispensing machine or any other item dispensing system that is known in the art, or any combination of such item dispensing systems. However, it is required that each of the item dispensing systems 149 of FIG. 8 have a system controller 145, for example, referring to FIG. 3, the microcontroller 74 and associated devices within the retailer module 38. In addition, each item dispensing system must have a communications port, for example, referring to FIG. 2, a retailer modem 34 or a retailer multidrop network terminal 36. As an alternative to a wired communications link, the port may be implemented using an RF or other wireless communications technology. Similar groupings of item dispensing systems, ID #1 . . . ID #n, are also located at a plurality of retailer locations, Retailer #1 . . . Retailer #n, in one or more other states, State #n.

In the embodiment of FIG. 8, each of the retailer locations 147 have respective retailer computers 151, and each of the retailer computers 151 is connected to associated system controllers 145 within the item dispensing systems 149 at a respective retail location by a wired or wireless bidirectional communications link 150 that conforms to the communications port on each of the item dispensing systems 149. The frequency with which data is transferred between the item dispensing systems at each retailer location 147 and a respective retailer computer 151 is dependent on the computer resources and the number of item dispensing systems at each retailer location 147, the expected sales volume of the item dispensing systems 149, etc. Thus, the reporting of data from an item dispensing system to the retailer computer 151 may be on a batch basis, for example, once each shift, one or more times each day or at some other interval. Alternatively, data may be reported or transferred from an item dispensing system 149 to the retailer computer 151 in real time in response to each item dispensing system transaction.

Thus, by whatever mode of data transfer is selected, each of the retailer computers 151 is able to collect and store data associated with the operation of each of the item dispensing systems 149 and provide desired reporting for each of the item dispensing systems 149 connected thereto as well as consolidate data to provide consolidated reports for groups of item dispensing systems. Such consolidated reporting is useful in providing financial reports to a client, for example, a state authority such as a supervising lottery commission. Consolidated reports can also assist a retailer in maintaining the appropriate ticket inventory. Further, individual item dispensing systems 149 can be serviced from a retailer computer 151 connected thereto. Thus, for example, password lists can be easily updated from a single, secure location, that is, the retailer computer 151.

The host computer 161 is normally at a location geographically remote from the retailer locations 147. As will be appreciated, the schematic showing of a host computer 161 in FIG. 8 is understood to be either a single computer or a plurality of host computers. The plurality of host computers may be a number of stand-alone computers dedicated to a particular one, or a group of, states; or the plurality of host computers may connected into a network of computers or implemented in another configuration. In some applications, a bidirectional communications link may directly connect the host computer 161 to a retailer computer 151 as shown by the communications link 160a between the host computer 161 and the retailer computer, RC #1 at Retailer #1 in State #1. With this embodiment, the retailer computer 151 may collect and store data therein or, collect data from the item dispensing systems 149 and immediately transfer that data to the host computer 161. Alternatively, a bidirectional communications link 160b may connect the host computer 161 to the system controllers 145 in each of the item dispensing systems 149 as shown by the communications links between the host computer 161 and the item dispensing systems, ID #1 . . . ID #n at Retailer #n in State #1.

As will be appreciated, any type and combination of communications links may be established between the various retailer locations 147 and the host computer 161. The choice of a configuration of one, or a combination of, communications links will depend on many factors such as the availability of different communications resources, their respective costs, etc. Such communications links may be a commercial telephone link, an Internet link, a cable link, a satellite link, etc. The selection of a communications link configuration and the frequency of data transmissions to the host computer will also depend on previously described factors, for example, the number of item dispensing systems 149 at a location, their level of activity, the requirements of the retailer and the state authority, etc.

As previously described with respect to the retailer computer 151, the host computer 161 stores transmitted data in a remote data collection ("RDC") database and provides individual item dispensing system reports or consolidated reports relating to items dispensed, sales dollars, item inventory, etc., as desired. Most often, the client or state computers 171 are at locations geographically remote from the host computer 161 and the retailers. The choice of a communications link configuration between the host computer 161 and the state computer 171 will depend on many of the same factors previously described with respect to the communications link 160 between each of the retailer locations 147 and the host computer 161.

Figure 9:
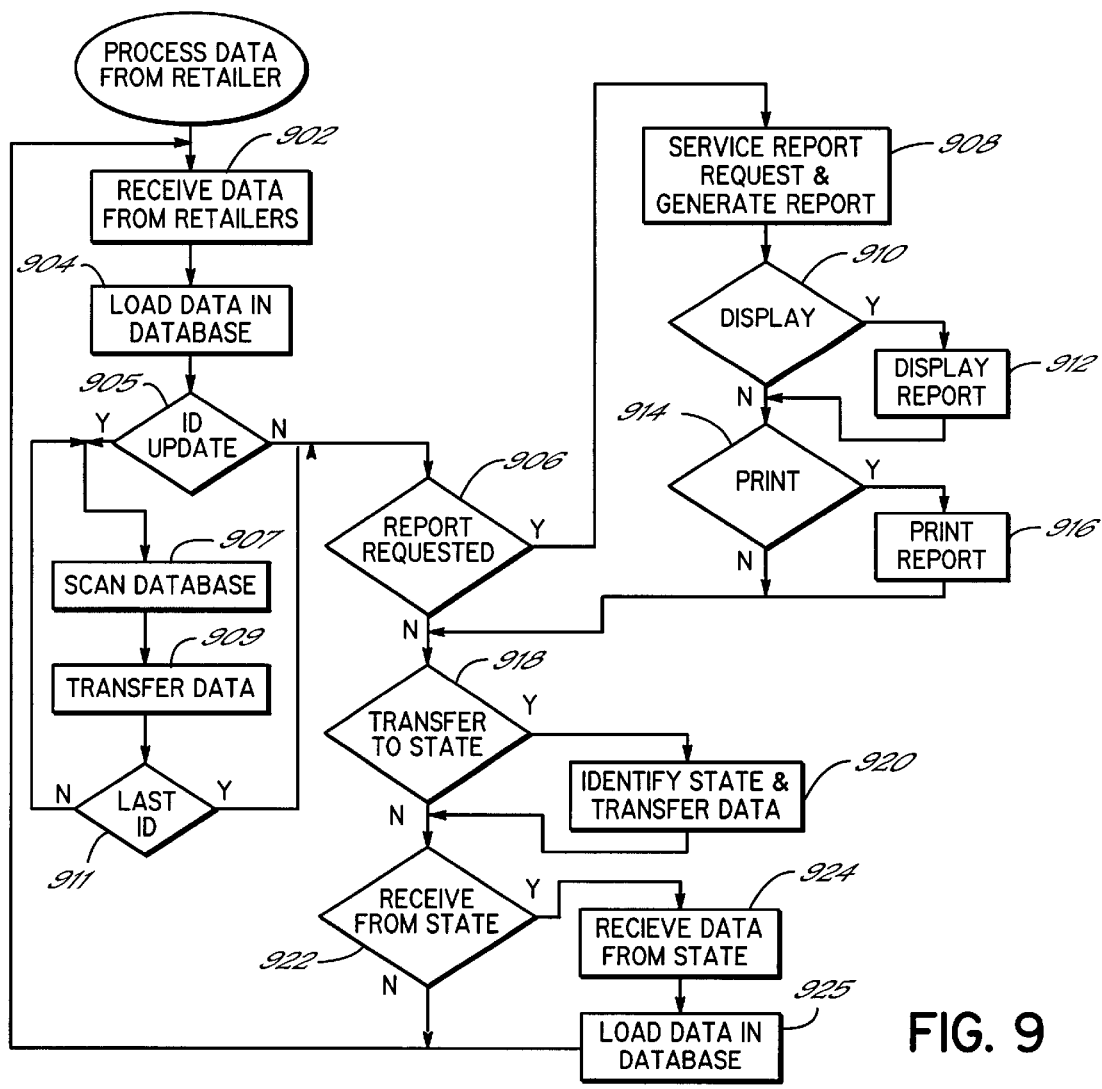
FIG. 9 is a flow chart of a process executed by a host computer within the embodiment of FIG. 8.

In use, referring to FIG. 9, the host computer 161, at 902, first receives data relative to one or more item dispensing systems 149 from one or more retailer locations 147 over respective communications links. As previously indicated, such data can be transmitted either on a transaction-by-transaction basis or on a batch basis. Further, if necessary, priorities may be assigned to the different retailers so that the host computer 161 processes the more urgent data first. At 904, the host computer 161 loads the data relating to one or more of the retailer's item dispensing systems 149 into RDC database within the host computer 161. If communicating on a batch basis, communications between any one of the retailer computers 151 and the host computer 161 is initiated by either of those computers. After the data is received from a particular retailer, if, at 905, none of the item dispensing systems is to be updated with data from the state, as will subsequently be described, the communications with that retailer are terminated. The host computer 161 operates on a continuing basis to collect data and maintain the RDC database with the most current information from all of the item dispensing systems 149. The host computer 161, at 906, detects whether a request for a report has been generated. A report request may be generated by the vendor or another entity as will be described.

A report request is serviced by the host computer 161 at 908. As part of the RDC database reporting function within the host computer 161, an electronic file of the requested report is generated. As previously described, the host computer is controlled by the vendor of the item dispensing systems, and a report request may be generated by the vendor. Further, the vendor may request that such report be displayed, printed or transmitted to another location. If a display request is detected, at 910, the generated report is displayed at 912. Similarly, a print request detected by the host computer 161, at 914, results in the host computer causing the report to be printed at 916. As will be appreciated, the report may be printed at the location of the host computer, or the host computer can cause the report to be printed at a location remote from the host computer.

The embodiment of FIG. 8 permits data relating to the item dispensing systems 149 at the various retail locations connected to the host computer 161 to be transferred to a client computer associated with a state authority. Thus, after servicing a report request or in the absence of a report request, the host computer 161 detects, at 918, a request to transfer data to the state authority. Such a request may be generated manually by the vendor or the state or, may be created automatically in response to a calendar/clock within the host computer, a time interval since the last data transfer, the detection of some operating condition of one or more item dispensing systems 149, etc. The host computer, at 920, services that request. The particular state authority is identified, and the fields of data associated with that state authority are identified and packaged for transmission to an appropriate one of the state computers 171. The host computer 161 collects a large amount of data relating to the operation of the item dispensing systems 149, however, not all of that data is required by each of the state authorities, and some of the data collected is for the exclusive use of the vendor and not required by any of the state authorities. The host computer identifies the state authority requesting the information, retrieves the data required by that state and transfers the data to the client computer associated with that state authority. That data is then used by the state authority to create reports relating to the dispensing of items, restocking of item inventories, etc.

With this embodiment, the state authority is able to transmit data to individual item dispensing systems 149 at selected retail locations. For example, some item dispensing systems have electronic displays that provide messages associated with the dispensing of items. From time to time, the state authority may wish to modify the content of those messages; and thus, the state authority transmits new messages to the item dispensing systems via the vendor's host computer. In those applications, the host computer 161, at 922, determines whether it has received a request to accept data from a state computer 171. If so, the host computer, at 924, receives data from the state computer which includes the text of a new message and the state identification number of item dispensing systems 149 that are to display the message. The host computer then at 925 loads that data in the vending machine update ("VME") VME database within the host computer 161 and sets an "ID Update" flags for each of the different item dispensing systems identified by the data received from the state.

During a subsequent iteration through the process of FIG. 9, each time a communications link is established with a retailer, the host at 905 checks the status of the "ID Update" flags to determine whether any data is waiting to be transferred to an item dispensing system. If any of the "ID Update" flags is set, then at 907, the host computer scans the VME database to identify whether any of the set "ID Update" flags correspond to item dispensing systems 149 at the retailer with which the communications link 160 is currently established and active. If an "ID Update" flag corresponds to an item dispensing system at the retailer with which communications are active, the host computer 161 at 909 proceeds to transfer data in the VME database associated with that item dispensing system over the communications link 160 to a respective retailer computer 151. Thereafter, the host computer resets the "ID Update" flag for that item dispensing system, and at 911, checks whether that was the last item dispensing system to be updated. If not, the process again at 907 scans the VME database for other set "ID Update" flags. If none are found for the item dispensing systems 149 at the current retailer location 147 with which communications is active a "Last ID" flag is set. That flag is detected at 911, is reset and the process checks for a report request at 906 as previously described. The data at the retailer computer 151 may be passed immediately to the appropriate item dispensing system, or the data may be buffered in the retailer computer 151 for a later transfer to an appropriate item dispensing system 149. Thereafter, the new message is then displayed on the electronic message boards of each of the item dispensing systems 149 identified by the state. The host computer 161 then iteratively executes the process of FIG. 9 as described above. A new text message is only one example of data that may be transferred from the state to individual item dispensing systems 149 at retail locations; and as will be appreciated, any other item dispensing system data can be transferred from the state to a desired item dispensing system.

Thus, with this embodiment, the vendor's host computer 161 of FIG. 8 has all of the information necessary to fulfill most, if not all, of the reporting requirements of each of the item dispensing systems 149 at various retail locations in one or more states. As will be appreciated, the host computer can transmit the raw data collected from the item dispensing systems to the state computers 171, or the host computer 161 can perform some processing of the data and transmit that processed data to the state computers. Further, the host computer 161 can prepare state specified reports using the collected data and transmit that data to the state computers. In addition, any communications with the state computers 171 can occur either on a transaction-by-transaction basis or, on a batch reporting basis, as the parties desire.

The embodiment of FIG. 8 has several advantages over known systems. First, the vendor's service obligations with the state authority may make it feasible for the vendor to provide a host computer 161 and establish a communications link between the retail locations and the host computer. The existence of such connections gives the vendor access to all of the data required to be reported to the state authority by the retailers. Further, the vendor is connected to a large number of retailer locations 147 and an even larger number of item dispensing systems 149; and therefore, the overhead costs of handling the data collection and reporting of the retailers can be spread thereover. Thus, the embodiment of FIG. 8 provides certain efficiencies heretofore unavailable.

Second, with the embodiment of FIG. 8, the communications between the retailer and the state authorities is, for all practical purposes, in real time and much faster than the current reporting systems in which reports are printed by the retailers and mailed or sent to the state authorities by courier. Having more current information permits the state authorities to more quickly audit the operations of the retailers and generate their own financial reports. That faster financial reporting should permit the state authorities to more quickly settle their financial accounts with the retailers. In addition, the better reporting will allow a more rapid response to low item inventories that may be detected. As in any business, more current, accurate information provides an opportunity for a more accurate analysis of current operations, more accurate predictions and a more efficient operation overall.

Figure 10:
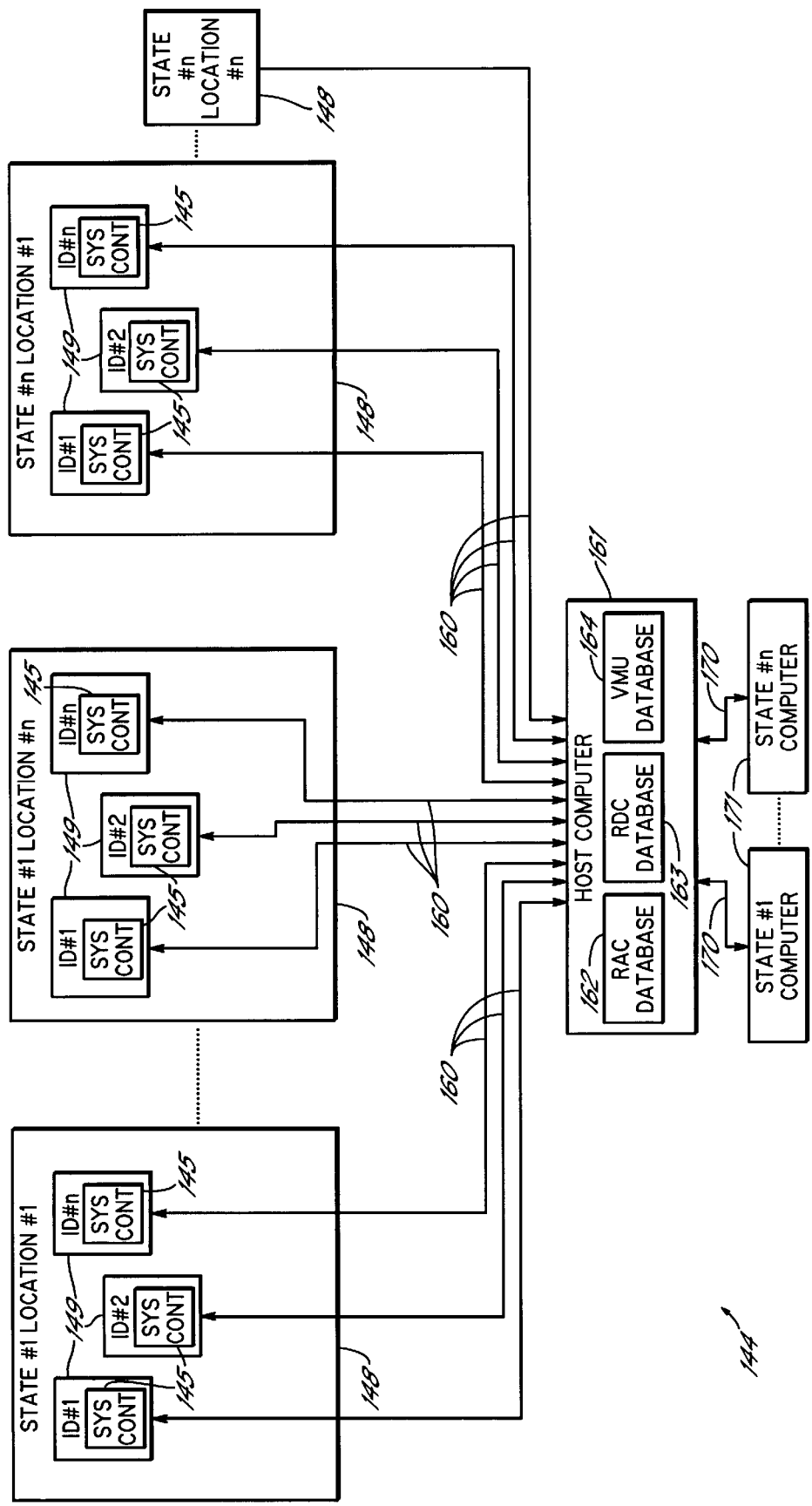
FIG. 10 is a schematic block diagram of a further embodiment of the invention that by which alarms are collected and reported in accordance with the principles of the present invention.

Another embodiment of the invention is illustrated in FIG. 10. In this embodiment, the item dispensing systems 149 are normally fully automated, stand-alone dispensing machines that are capable of dispensing items that can be compactly stored in bulk, for example, lottery tickets or other types of tickets, phone cards, stamps, cards or any other items capable of being relatively compactly inventoried and automatically dispensed. As with the embodiment of FIG. 8, each of the item dispensing systems 149 has a system controller 145 including a communications port. As an alternative to a wired communications link, the port may be implemented using an RF or other wireless communications technology. A wired or wireless bidirectional communications link 160 exists between a host computer 161 and the item dispensing systems 149 at the various locations 148. Similarly, a wired or wireless bidirectional communications link 170 exists between a host computer 161 and the state computers 171. With such communications links 160, 170, the host computer 161 is able to remotely collect data and alarms from the various item dispensing systems 149 as well as pass on data from various state computers 171 to appropriate ones of the of the item dispensing systems 149. Thus, the devices of FIG. 10 function collectively as an item dispensing system network or a RDAC network 144.

As with the embodiment of FIG. 8, in this embodiment, a client of the dispenser vendor is normally the item vendor, that is, any entity that uses the vendor's dispensers for dispensing items. The described sale of lottery tickets by a state authority is only one example of a client or item vendor and an item dispensing system of the present invention. As will be appreciated, commercial relationships described herein are illustrative and are not to be considered a limitation on the scope of the invention. The host computer as recited in the claims can be any computer, for example, a computer 161, that collects alarms from and/or exchanges data with item dispensing systems 149 regardless of commercial relationships.

The locations 148 may be any location including a commercial retail location. The host computer 161 is normally at a location geographically remote from the locations 148. As will be appreciated, the schematic showing of a host computer 161 in FIG. 10 is understood to be either a single computer or a plurality of host computers. The plurality of host computers may be a number of stand-alone computers dedicated to a particular one, or a group of item vendors, for example, states; or the plurality of host computers may be connected into a network of computers or implemented in another configuration.

As will be appreciated, any type and combination of communications links 160, 170 may be established between system controllers 145 and a host computer 161 and the host computer 161 and a state computer 171. The choice of a configuration of one, or a combination of, communications links will depend on many factors such as the availability of different communications resources, their respective costs, etc. Such communications links may be a commercial telephone link, an Internet link, a cable link, a satellite link, etc. The selection of a communications link configuration and the frequency of data transmissions to the host computer will also depend on previously described factors, for example, the number of item dispensing systems 149 at a location, their level of activity, the requirements of the item vendor, for example, a state authority, the requirements of an item dispensing system service provider, for example, the item dispensing system vendor, etc.

As described with respect to FIG. 8, in the embodiment of FIG. 10, vendors of the item dispensing systems 149 normally lease or sell item dispensing systems to item vendors for different periods of time. In addition, for items such as lottery tickets, the item vendors often have a maintenance contract with the item dispensing system vendor to keep the item dispensing systems operating reliably at the various locations. The obligation to maintain adequate item inventories in the item dispensing systems is normally undertaken by an entity at the site of the item dispensing system. Thus, in the present example, a maintenance and service contract often exists between the item dispensing system vendor and the item vendors, that is, the different state authorities, to maintain lottery ticket dispensing machines operating properly. In the fulfillment of maintenance and service responsibilities, some service providers hire persons to periodically visit the item dispensing systems, for example, daily, weekly, etc. While such a process may be effective in some environments, in many environments some item dispensing systems are used significantly more than other machines. Further, if a fault or a failure does occur, the item dispensing system may remain inoperative until the next periodic visit by a service person. Therefore, it is highly desirable to be able to monitor the operation of the item dispensing systems and provide service on the basis of their use as well as any faults that may occur.

The absence of a communications link between an item dispensing system and the host computer means that fault conditions within the item dispensing system may go unreported. Further, the fault may go unreported, and the item dispensing system may be out of service until the fault condition is reported and a service agent is able to respond. A better item dispensing system is one in which fault conditions are automatically monitored and reported so that service agents can be dispatched to cure the fault. While such a system is an improvement over no-fault reporting, in some situations, a fault may not result in an item dispensing system being removed from service. Dispatching a service person to address a fault which does not remove an item dispensing system from service is a nuisance and not an efficient use of service personnel.

Therefore, a superior item dispensing system is one that monitors fault conditions in real time but selectively creates alarms, for example, in only those situations in which the item dispensing machine is out of service or about to go out of service. Therefore, the present item dispensing system has two categories of faults —fatal faults and nonfatal faults. Fatal faults are referred to herein as fault conditions that take an item dispensing system out of service or substantially impact the immediate continuing operation of the item dispensing system. Conversely, nonfatal faults are referred to herein as fault conditions that do not take the item dispensing system out of service or do not substantially impact the immediate continuing operation of the item dispensing system. For example, if a monitored fault is a fatal fault, an out of service alarm is generated. However, if a monitored fault is a nonfatal fault, an alarm may or may not be generated depending on the relationship of the nonfatal fault to the stored alarm limits.

Further, threshold values that trigger nonfatal faults are programmable, so that nonfatal faults can be provided that warn of impending fatal fault conditions. Thus, the item dispensing system can be tuned to create various warning alarms representing either the existence of, or the approach of, fatal fault conditions. The ability to adjust or filter the occurrence of faults and alarms minimizes the occurrence of nuisance alarms and permits service agents to be utilized more efficiently. With the RDAC network 144 of FIG. 10, each item dispensing system 149 automatically tracks its own operating condition in real time and only sends an alarm to the host 161 in the event that a fatal fault has taken, or one or more nonfatal faults are about to take, the item dispensing system out of service. The user of the host computer 161 then monitors the alarms being provided by the item dispensing systems 149 and is able to more quickly and cost effectively dispatch service agents to the various locations 148 to minimize any downtime of the item dispensing systems 149.

Figure 11:
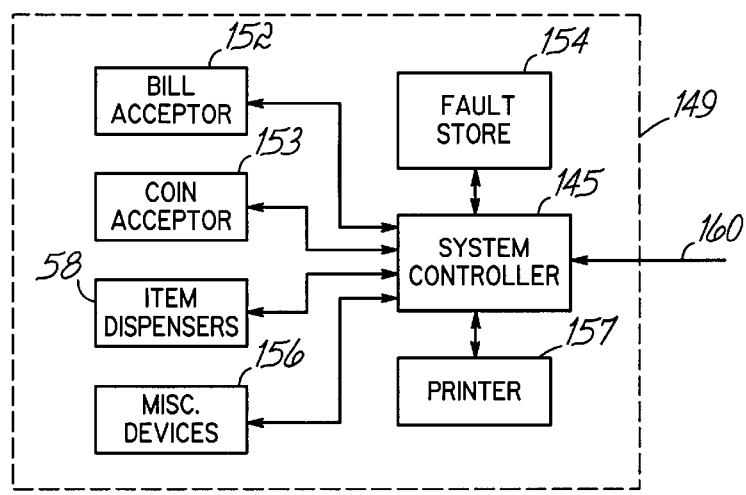
FIG. 11 is a schematic block diagram of an item dispensing system within the embodiment of FIG. 10.

Referring to FIG. 11, the system controller 145 is in electrical communications with cash receiving and storing devices, for example, a bill acceptor 152 and coin acceptor 153. Both the bill acceptor 152 and coin acceptor 153 provide signals to the system controller 145 that are indicative of the operation of the respective devices. The system controller 145 analyzes or manages the signals being provided by the respective bill and coin acceptors 152, 153 to determine their proper operation as well as any fault conditions that may occur. The system controller 145 is thus able to determine the numbers of bills and coins accepted, the cash values of the bills and coins accepted, the total value of the cash held in the item dispensing system 149 as well as any fault condition. Those data values are stored in memory associated with the system controller 145 including the fault store 154.

The system controller 145 is also in electrical communications with item dispenser modules 58 (FIG. 2). Any particular item dispensing system 149 may have one or multiple, for example, up to 9 or more, item dispensers 58. The item dispensers 58 have various solenoids, motors, lights, etc., which are operated by command signals originating with the system controller 145. In addition, the item dispensers 58 have various proximity detectors and other devices that provide feedback signals to the system controller 145. In controlling the operation of the item dispensers 58, the system controller 145 is able, via feedback signals from the item dispensers 58, to detect various operating states as well as fatal and nonfatal fault conditions. Upon those faults being detected, the system controller 145 stores the fault conditions in the fault store 154 in association with an identity of a respective one of the item dispensers 58. Based on an analysis of other signals indicative of the operating condition of each of the item dispensers 58, the system controller may determine other fatal or nonfatal fault conditions that are also stored in the fault store 154.

The system controller 145 also provides command or data signals to, and receives feedback signals from, other miscellaneous devices that are not shown, for example, lights, motors, limit switches, solenoids, etc., within the item dispensing system 149. The system controller 145 often counts the occurrence of operation of certain switches, for example, a switch detecting the opening and closing of an access door to the item dispensing system 149. Other fault conditions are determined by the system controller 145 from the monitoring of the operation of those devices and stored in the fault store 154. The system controller 145 is also in electrical communication with a printer 157 which is used by service persons to obtain reports with respect to the operation of the item dispensing system 149. Based on the monitoring of the operating state of the printer 157, the system controller 145 determines and stores faults associated with the printer 157. Therefore, during the operation of the item dispensing system 149, the system controller 145 continuously monitors the devices within the item dispensing system 149 and maintains a record of detected or determined fatal and nonfatal faults within the fault store 154. Further, the system controller generates and stores fault states in the fault store 154 in response to detecting or determining various fault conditions. Upon an alarm being generated, the system controller 145 transfers the alarm signal and the current status of the faults in the fault store 154 to the host computer 161 for further processing.

Figure 12:
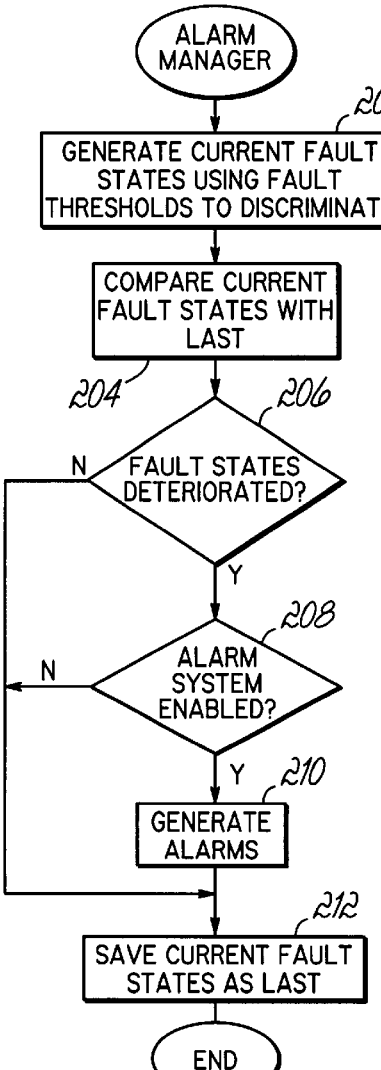
FIG. 12 is a flow chart of an alarm manager subroutine executed by a system controller within the embodiment of FIG. 10.

During the process of operating the item dispensing system 149 of FIG. 11, the system controller 145 periodically executes an alarm manager subroutine illustrated in FIG. 12. The alarm manager feature described herein is optional and may be turned on or off as desired. Assuming the alarm manager is turned on, the system controller 145 is continuously monitoring the operation of all of the devices within the item dispensing system 149. Further, a number of faults are defined and stored in the fault store 154 which relate to the operating condition or state of the various devices in the item dispensing system 149. Such faults may, for example, relate to whether the bill acceptor 152 or the cash acceptor 153 is jammed, the inventory of items in the item dispensers 58, the number of bills stored in the item dispensing system 149, etc. Further, there may be composite faults that relate to the operating conditions or states of a plurality of the devices within the item dispensing system 149. For example, if a plurality of item dispensers 58 are dispensing the same item, a composite fault may relate to the collective inventory of items in the plurality of item dispensers 58.

In addition, fault thresholds for each of the faults are stored in the fault store 154. A fault threshold is a stored value representing a state that triggers a fault. Therefore, as the system controller 145 processes feedback signals from the devices in the item dispensing system and monitors their respective operational conditions or states, in executing the alarm manager subroutine, at 202, the system controller 145 compares the operational state of the devices in the item dispensing system with the fault thresholds stored in the fault store 154. The current state of the faults in the fault store 154 are thus determined by the system controller 145 based on whether the current operating conditions of the devices meet the stored fault thresholds. If the current operating conditions or states are equal to, or otherwise meet, certain ones of the stored fault thresholds, the current states of the faults associated with those stored fault thresholds are registered, that is, switched to a true state, in the fault store 154. The current states of the other faults in the fault store 154 remain unchanged. As indicated earlier, there may be composite faults that are defined by the states of other faults. The alarm manager, at 202, also determines the state of composite faults as a function of the current states of the faults defining the respective composite faults.

Next, at 204, the alarm manager subroutine sequentially compares or tests the current state of each of the faults with the last or immediately prior state of each of the faults that was determined and stored in the fault store 154 during a prior execution of the alarm manager subroutine. At 206, the alarm manager subroutine determines if any of the registered current faults has deteriorated. In other words, has a current fault switched from a false state to a true state during the last iteration of the alarm manager subroutine. With a composite fault, the existence or registering of one of the current faults defining the composite fault may or may not cause the composite fault to be registered or switched true, depending on the states of the other faults defining the composite fault. Thus, the system is very flexible in being able to define faults and determine a particular deteriorated state of operation of the system.

The alarm manager subroutine, at 208, determines whether the alarm system is enabled; and if so, at 210, the alarm manager subroutine generates an alarm in response to a deterioration of a registered fault. Thereafter, at 212, the alarm manager subroutine saves the current fault states as the last fault states in the fault store 154.

In one example of the above process, the system controller 145 continuously monitors the operation of the bill acceptor 152. In that monitoring process, the system controller 145, in some applications, detects a true state of a feedback signal indicating that the bill acceptor 152 is jammed. The alarm manager subroutine, at 202, in the process of discriminating all of the fault states with respect to respective fault thresholds, compares the true state of that feedback signal to a true state of a corresponding fault threshold in the fault store 154. Detecting that the states are the same, the alarm manager registers the bill acceptor out of service fault; and therefore, that fault has a current true state in the fault store 154. Next, after comparing all of the current fault states with all of the immediately prior or last fault states, at 204, the alarm manager, at 206, determines which current fault states have deteriorated. In this example, the alarm manager determines whether the current state of the bill acceptor out of service fault has deteriorated from the last iteration of the alarm manager subroutine. Assuming that the alarm manager is enabled, if the current state of the bill acceptor out of service fault has not changed, that is, its last state was true and its current state is true, no alarm is generated. If the last state of the fault was true, an alarm was previously generated; and therefore, the check for fault deterioration prevents the generation of redundant alarms. However, if the bill acceptor out of service fault has deteriorated, an alarm is generated at 210. Then, at 212, the current states of all of the faults are stored as the last states of the faults; and in this example, the current true state of the bill acceptor out of service fault is stored as its last state in the fault store 154. The system controller 145 also immediately transfers the alarm and the current status of the faults in the fault store to the host computer 161.

Under some circumstances, a fault condition, for example, a fatal fault, immediately produces an alarm that is immediately reported to the host computer, for example, a bill acceptor out of service fault. However, as indicated earlier, some fault conditions are nonfatal faults and do not take the item dispensing system out of service or do not substantially impact the immediate continuing operation of the item dispensing system. The present invention permits fault thresholds for nonfatal faults to be varied, so that alarms are generated in a manner that promotes a continuous, uninterrupted operation of the item dispensing system. Assume, for example, that the system controller 145 controls the operation of a plurality of item dispensers 58 dispensing different items. The system controller 145 is able to maintain an internal record of the number of items dispensed by each of the item dispensers 58. Further, the system controller 145 can be programmed with the maximum number of items provided in each of the item dispensers 58. Thus, the system controller 145 is able to maintain, for each of the item dispensers 58, a running inventory of the undispensed items.

With the present invention, a low dispenser inventory threshold for the item dispensers 58 is stored in the fault store 154 and can be any number less than the maximum number of items dispensable, including zero. Normally, the low dispenser inventory fault threshold is set to the same number for all item dispensers 58 in the item dispensing system 149. The low dispenser inventory threshold value can be a percentage of the maximum number of items or a number based on other factors such as average usage of the item dispensing system 149, the expected time required to provide service personnel to the machine, etc. Hence, when the system controller 145, at 202, determines that an item dispenser 58 has an undispensed number of items equal to a corresponding low dispenser inventory threshold value in the fault store 154, a low dispenser inventory fault for that item dispenser is registered or switched to a true state. The alarm manager subroutine compares the current state of that fault to its last state, at 204 and, at 206, determines whether the state of the low dispenser inventory fault for that item dispenser has deteriorated. Since it has, an alarm is generated and subsequently transferred to the host computer 161. The operator of the host computer can then advise someone at the site of the item dispensers to check the item inventory prior to the inventory being depleted.

In some installations having a plurality of item dispensers, it may not be desirable to generate and alarm every time a low dispenser inventory fault is registered. For example, if the item dispensing system 149 contains a plurality of item dispensers 58 (FIG. 2), the fact that a single item dispenser has a low inventory of items may not warrant that the item dispensing system 149 be serviced. Therefore, the system controller 145 may permit a low dispenser inventory fault to be registered for two or more of the item dispensers within the item dispensing system 149 before generating an alarm. In this embodiment, a multiple dispenser low inventory ("MDLI") composite fault is created that monitors the registration of low dispenser inventory faults of all of the item dispensers 58 within the item dispensing system 149. A determination is made by the user as to how many item dispensers 58 will be allowed to reach their low dispenser inventory threshold before an alarm is sent to the host computer 161. For example, if the item dispensing system has eight item dispensers and it is determined that four low dispenser inventory faults will be allowed before an alarm is sent to the host computer 161, the MDLI composite fault threshold is set to four. In the execution of the alarm manager subroutine, the MDLI composite fault remains false as long as only three of the eight item dispensers register a low dispenser inventory fault. However, as soon as any four of the eight item dispensers register a low dispenser inventory fault, the MDLI composite fault threshold is met, and the MDLI composite fault is registered or set to a true state in the fault store 154. An alarm is generated in response to detecting a deterioration of the MDLI composite fault, and the alarm and the current states of the faults in the fault store 154 are immediately transferred to the host computer 161. Such a system continuously tracks the current, real-time status of an item dispensing system and thus, makes more cost effective and efficient use of service agents. For example, it is possible that after two item dispensers registered a low dispenser inventory fault, the item dispensing system is serviced for some other reason; and additional inventory is added to one of the item dispensers registering a low dispenser inventory fault. When the item dispensing system is placed back in service, the low dispenser inventory fault for that item dispenser is switched back to a false state.

With the capability of adjusting alarm limit threshold values, numerous item dispensing system operating states that would normally result in an out of service condition can be anticipated; and thus, an alarm can be created representing an approaching out of service condition. For example, without the ability to adjust alarm thresholds, a bill capacity fault and alarm is created when the item dispensing system reaches its maximum bill storage capacity and is out of service. In this situation, the bill acceptor 152 is out of service until a service agent can be dispatched to the item dispensing system 149 to service the bill acceptor 152. Alternatively, with the present invention, a bill capacity fault threshold value is stored in the fault store 154 that is less than the maximum bill capacity. The bill capacity fault threshold value can be chosen arbitrarily, for example, 85% or 90% of maximum capacity. The bill capacity fault threshold may also be influenced by a historical knowledge of the traffic or level of activity of the bill acceptor 152, the time required to dispatch a service person to the item dispensing system 149, etc.

The system controller 145, based on input signals from the bill acceptor 152, maintains a running count of the bills being accepted and stored by the item dispensing system 149. The alarm manager subroutine of FIG. 12 provides a bill capacity fault when the number of bills stored in the item dispensing system equals or exceeds the number of bills represented by the stored bill capacity fault threshold value. The bill capacity fault indicates that the bill acceptor 152 is approaching its maximum capacity and therefore, will soon be out of service. The bill capacity fault is determined by the alarm manager subroutine of FIG. 12 as previously described; and in response to a deterioration of the bill capacity fault, an alarm is generated, stored and transferred to the host computer 161. Thus, the item dispensing system can be serviced prior to it going out of service because the bill acceptor is full. It should be noted that different bill capacity fault thresholds may be stored for the different denominations of bills accepted by the bill acceptor 152.

By using the fault store 154 in a similar manner, a coin acceptor capacity fault threshold value can be stored in the fault store 154 which is a number less than the maximum coin capacity. When the system controller 145 detects a number of coins accepted by the coin acceptor 153 equal to the coin acceptor capacity fault threshold, a current coin acceptor fault is registered or switched true. Upon detecting the deteriorated state of the coin acceptor capacity fault, a coin acceptor alarm is created and transmitted to the host computer 161. Therefore, the coin acceptor 153 can be serviced prior to it going out of service because it has reached its maximum capacity. Again, a different fault threshold value can be established and monitored for each different denomination of coin accepted by the coin acceptor 153.

The system controller 145 also continuously tracks the amount of cash which has accumulated within the item dispensing system 149 represented by the monetary value of all of the bills and coins accepted and stored. Normally, the item dispensing system 149 is serviced to remove all of its stored cash at periodic intervals. The ability of the present invention to store fault threshold values provides a more efficient and superior system. A cash overlimit threshold value is stored in the fault store 154, and the system controller 145 produces a cash overlimit fault when the monetary value of the cash accepted and stored in the item dispensing system 149 equals the cash overlimit threshold value. Thus, as cash accumulates in the item dispensing system 149, the system controller 145 enables a cash overlimit fault upon the stored cash having a value that is less than the user determined cash limit value. Upon detecting a deterioration of a current cash overlimit fault, an alarm is transferred to the host computer 161. The user of the host computer 161 knows that the cash overlimit alarm is a warning that the cash value accumulated in the item dispenser has met or exceeded the user determined cash over limit threshold value. Service agents can then be dispatched in a rational manner, depending on the existence of other alarm conditions, the need to service other item dispensing systems in the locale, the number of service agents available and their schedules, etc.

Figure 13A:
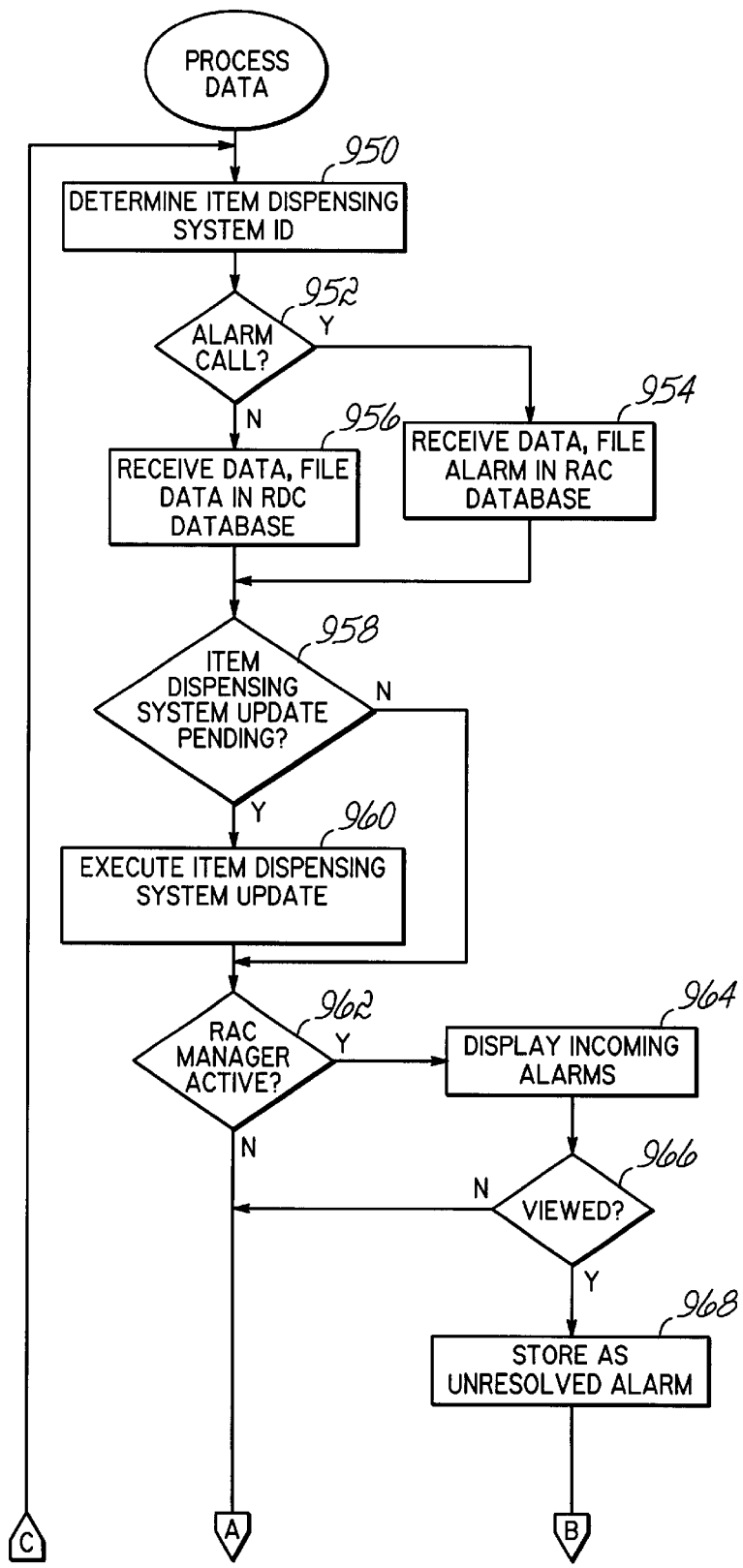
FIGS. 13A and 13B are a flow chart of a process executed by a host computer within the embodiment of FIG. 10.
Figure 13B:
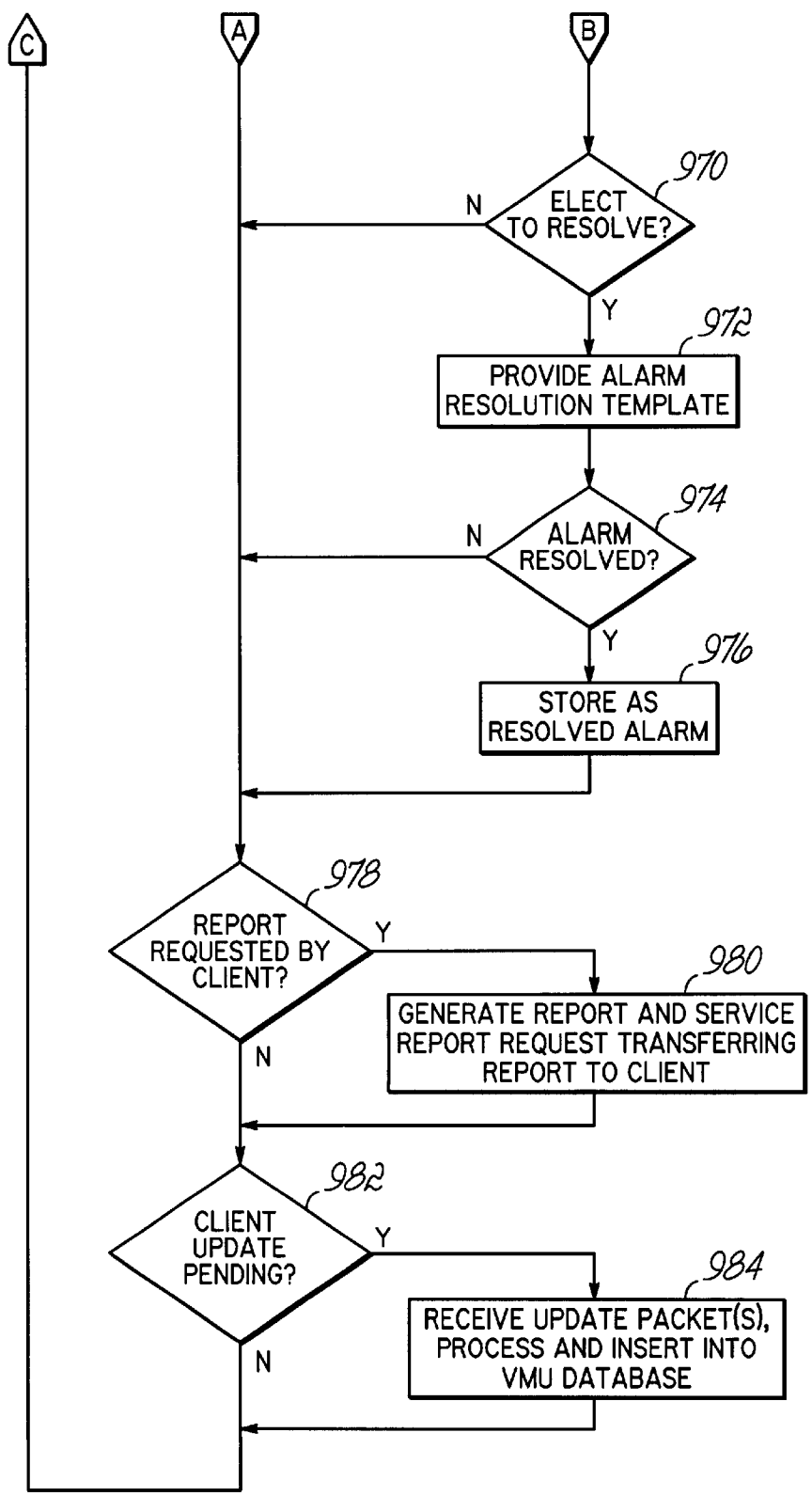

Upon an alarm being created by the alarm manager subroutine of FIG. 12, the system controller 145 immediately attempts dial-up or otherwise opens a communication channel or link with the host computer 161. Should the system controller 145 fail in its initial attempt to transmit the alarm and the associated faut table to the host computer 161, it will continue in a series of further attempts until the alarm and associated fault states are successfully communicated to the host computer 161. Referring to FIGS. 13A and 13B, upon data being transferred to the host computer 161 within the RDAC network 144 of FIG. 10, the host computer 161 first, at 950, determines an identity of the item dispensing system 149 from which the data is being transferred. As indicated earlier, there may be hundreds of item dispensing systems 149 connected to the host computer 161, and the operating condition of each of those item dispensing systems must be stored in the host computer 161. The host computer 161 then, at 952, determines whether the data transferred contains an alarm; and if so, at 954, the alarm is received and stored in a remote alarm collection ("RAC") database 162 within the host computer 161. If the data from the item dispensing system 149 is not an alarm but other data, for example, data relating to items dispensed, sales dollars, item inventory, etc., the host computer 161, at 956, receives and stores that data in the RDC database 163 within the host computer 161.

The host computer 161, at 958, determines whether an item dispensing system update is pending; and if so, at 960, executes an item dispensing system update. At 962, the host computer 161 determines whether the remote alarm collection feature is active or inactive. The remote alarm collection feature can be turned on or off by the user of the host computer 161. If the collection of remote alarms is enabled, the host computer 161, at 964, proceeds to scan the RAC database 162 and display the incoming alarms from the various item dispensing systems 149. The host computer 161 then, at 966, tracks whether the incoming alarms have been viewed by a user. If not, the alarm maintains its incoming alarm status. Once the user views an incoming alarm, the host computer 161 then, at 968, automatically changes the status of the incoming alarm to that of an unresolved alarm for display and storage purposes.

The states of all the faults in the fault store 154 associated with a particular item dispensing system 149 for which an alarm was generated were transferred to the host computer 161 with the alarm. Therefore, In the process of resolving an alarm, by observing the states of the faults, the user can then make decisions as to the cause of the alarm. The user is able to determine whether the item dispensing machine has experienced a fatal fault and is out of service or, whether a nonfatal fault has occurred and service will probably be required in the near future. Thus, the user is able to determine how the alarm should be resolved. The host computer 161, at 970 (FIG. 13B), tracks whether the user has attempted a resolution of the alarm. By definition, within the host computer 161, a resolution of the alarm means that the user has entered information relating to how the alarm is being resolved. As part of that resolution process, the user, at 972, selects for display an alarm resolution template; and using that template, the user has the options of identifying the person servicing the alarm, a summary of the alarm and other comments relating to the resolution of the alarm and how it should be resolved. Upon the host computer 161 detecting, at 974, that a resolution of the alarm has been entered, the host computer 161 then, at 976, changes the status of the alarm to that of a resolved alarm for subsequent display and storage.

As part of the process of processing data from an item dispensing system, the host computer 161, at 978, determines whether a report has been requested by a client. If so, at 980, the host computer 161 services that report request. The host computer 161, at 982, determines whether a client update is pending; and if so, at 984, data is transferred from a client, for example, a state computer 171, and stored in the vending machine update database 164 of the host computer 161. It should be noted that the flowchart of FIGS. 13A and 13B is directed to the processing of alarms and is an expansion of the flowchart of FIG. 9. The processing of data by the host computer 161 for reporting, and the processing of data from a client, is discussed in more detail in the description with reference to FIG. 9.

The selectable or programmable fault thresholds of the present invention provide almost unlimited flexibility in being able to monitor the operating states of individual devices within each of the item dispensing systems 149 within the RDAC network 144. First, the present invention has the ability to segregate fatal faults from nonfatal faults. Thus, alarms can be immediately transferred to the host computer 161 upon the occurrence of a fatal fault, that is, a fault indicating the item dispensing system is out of service. However the automatic creation of alarms based on nonfatal faults is avoided, thereby minimizing the occurrence of nuisance alarms and the dispatching of service agents to item dispensing systems that are not out of service. Second, the present invention has the capability of being able to independently adjust the fault thresholds for each of the individual devices within each of the item dispensing systems. Therefore, fault and alarm sensitivity can be adjusted to meet the unique requirements of each item dispensing system 149.

This capability allows nonfatal faults and alarms to be tuned so that operating states of devices within the item dispensing system, which would normally lead to an out of service condition, can be tracked. Thus, a potential out of service condition can be anticipated, and the item dispensing system can be serviced before its occurrence. The present invention provides a significant advantage in being able to tailor and prioritize the generation and transmission of alarms to the host computer 161. This operation of the system controller 145 limits the number of alarms presented to the host computer 161 and substantially reduces the load of the host computer 161 when it is connected to a large number of item dispensing systems. By performing that function automatically, the user of the host computer 161, who is often responsible for the maintenance of hundreds of item dispensing systems, is presented with a burden that is significantly reduced. With the above capability, the allocation of service agent assets can be made more rational, efficient and cost effective to the benefit of everyone.

While the present invention has been illustrated by a description of various preferred embodiments and while these embodiments have been described in considerable detail in order to describe the best mode of practicing the invention, it is not the intention of Applicant to restrict or in any way limit the scope of the appended claims to such detail. Additional advantages and modifications within the spirit and scope of the invention will readily appear to those skilled in the art. For example, in the described embodiment, the generation of faults and alarms is performed by the system controller 145. While that embodiment is perceived to be more efficient and less costly, as will be appreciated, those tasks may alternatively be performed within the host computer 161 or some other computer either local with, or remote from, the system controller 145.

Further, as will be appreciated, other system configurations can benefit from a distributive processing system that utilizes fault thresholds and faults as described herein. Such configurations include, but are not limited to, configurations in which a retailer collects the cash and thus, does not have bill or coin acceptors. Further, while several specific examples of fault thresholds and faults are described herein, the claimed invention can be used to detect other operating conditions of item dispensers.

In the described embodiment, a determination is made, at 206 of FIG. 12, whether a current state of a fault represents a deterioration of the fault; and an alarm is only provided in the event that a deterioration of the fault is detected. As will be appreciated, the test for a fault deterioration is provided so that faults registered during a current iteration of the alarm manager subroutine can be distinguished from faults registered during prior iterations of the alarm manager subroutine. Faults registered during prior iterations of the alarm manager subroutine have already precipitated the transfer of an alarm to the host computer 161. A retransmission of an alarm for a continuing fault as detected during a current iteration of the alarm manager subroutine is an inefficient user of valuable communications assets. Therefore, the alarm manager subroutine only generates alarms associated with deteriorated faults. As will be appreciated, although less efficient, the test for a deterioration of a fault may be omitted; and an alarm is generated for each current fault that is registered. Redundant alarms may or may not be subsequently identified and eliminated, if desired, either before or after their transmission to the host computer 161.

Therefore, the invention in its broadest aspects is not limited to the specific detail shown and described. Consequently, departures may be made from the details described herein without departing from the spirit and scope of the claims which follow.

What is claimed is:

1. An item dispensing system comprising:
   a plurality of item dispensers located at different retail locations, each of the item dispensers comprising
      a fault store which stores
         a fault threshold representing an operating state of the item dispenser, and
         a fault having two states; and
   a controller in electrical communications with the item dispenser and the fault store, the controller
      switching the fault to a first state in response to detecting the operating state of the item dispenser represented by the fault threshold, and
      producing an alarm in response to detecting only a deterioration of the fault; and
   a host computer located geographically remotely from the retail locations, the host computer being in electrical communications with, and receiving the alarm from, the controller.

2. The item dispensing system of claim 1 wherein the controller produces an alarm in response to detecting the first state of the fault.

3. An item dispensing system comprising:
a plurality of item dispensers located at different retail locations, each of the item dispensers comprising
a bill acceptor adapted to accept bills,
a fault store which stores
a fault threshold representing a stored number smaller than a number of bills storable in the bill acceptor, and
a fault being switchable to a first state in response to the bill acceptor storing a number of bills at least equal to the stored number, and
a controller in electrical communications with the item dispenser, the fault store and the bill acceptor, the controller producing an alarm in response to detecting only a deterioration of the fault; and
a host computer located geographically remotely from the retail locations, the host computer being in electrical communications with, and receiving the alarm from, the controller.

4. An item dispensing system comprising:
a plurality of item dispensers located at different retail locations, each of the item dispensers comprising
a coin acceptor adapted to accept coins,
a fault store which stores
a fault threshold representing a stored number smaller than a number of coins storable in the coin acceptor, and
a fault being switchable to a first state in response to the coin acceptor storing a number of coins at least equal to the stored number, and
a controller in electrical communications with the item dispenser, the fault store and the coin acceptor, the controller producing an alarm generated in response to detecting only a deterioration of the fualt; and
a host computer located geographically remotely from the retail locations, the host computer being in electrical communications with, and receiving the alarm from, the controller.

5. An item dispensing system comprising:
a plurality of item dispensers located at different retail locations, each of the item dispensers comprising
a cash acceptor,
a fault store for storing which stores
a fault threshold representing a stored value smaller than a desired total cash value to be stored in the cash acceptor, and
a fault being switchable to a first state in response to the cash acceptor storing a total cash value at least equal to the stored value; and
a controller in electrical communications with the item dispenser, the fault store and the cash acceptor, the controller producing an alarm in response to detecting only a deterioration of the fault; and
a host computer located geographically remotely from the retail locations, the host computer being in electrical communications with, and receiving the alarm from, the controller.

6. The item dispensing system of claim 5 further comprising a printer in electrical communications with the controller.

7. The item dispensing system of claim 5 wherein the controller produces an alarm in response to detecting the first state of the fault.

8. An item dispensing system comprising:
a plurality of item dispensers located at different retail locations, each of the item dispensers comprising
a fault store which stores
first and second fault thresholds representing respective first and second numbers smaller than a number of items dispensable by first and second item dispensers, respectively, and
first and second faults being switchable to a first state in response to the first and second item dispensers dispensing a number of items at least equal to the first and second numbers, respectively, and
a controller in electrical communications with the item dispenser and the fault store, the controller producing an alarm in response to detecting only a deterioration of both of the first and second fault states; and
a host computer located geographically remotely from the retail locations, the host computer being in electrical communications with, and receiving the alarm from, the controller.

9. The item dispensing system of claim 8 wherein the controller produces the alarm in response to the first and second faults being switched to their respective first and second fault states.

10. An item dispensing system comprising:
a plurality of item dispensers located at different retail locations, each of the item dispensers comprising
a fault store which stores
a plurality of fault thresholds, each fault threshold representing a first number smaller than a maximum number of items dispensable by a respective item dispenser, and
a plurality of faults, each fault being switchable to a respective first state in response to a respective item dispenser dispensing a number of items at least equal to the first number, and
a controller in electrical communications with the item dispenser and the fault store, the controller producing an alarm in response to detecting a predetermined number of the faults being switched to deteriorated states; and
a host computer located geographically remotely from the retail locations, the host computer being in electrical communications with, and receiving the alarm from, the controller.

11. The item dispensing system of claim 10 wherein the controller produces the alarm in response to the predetermined number of the faults being switched to their respective first states.

12. An item dispensing system comprising:
a plurality of item dispensers located at different retail locations, each of the item dispensers comprising
a fault store which stores a fault threshold and a fault; and
a controller which independently operates the item dispenser and providing data relating to items dispensed by the item dispenser, the controller being in electrical communications with the item dispenser and the fault store, and the controller producing an alarm in response to detecting a change of state of the fault;
a host computer located geographically remotely from the retail locations, the host computer being in electrical communications with, and receiving the alarm and the data relating to items dispensed by the item dispensers from the controller; and
another computer located geographically remotely from the retail locations and the host computer, the other computer in electrical communications with the host computer for receiving data relating to items dispensed at one of the retail locations.

13. The item dispensing system of claim 12 wherein the controller produces an alarm in response to detecting a deterioration of the fault.

14. The item dispensing system of claim 12 further comprising a fault store for storing
- a fault threshold representing an operating state of the item dispenser, and
- a fault having two states.

15. The item dispensing system of claim 14 wherein the controller
- switches the fault to a first state in response to detecting the operating state of the item dispenser represented by the fault threshold, and
- produces the alarm in response to detecting only a deterioration of the fault.

16. The item dispensing system of claim 15 wherein the controller produces the alarm in response to detecting the first state of the fault.

* * * * *

UNITED STATES PATENT AND TRADEMARK OFFICE
CERTIFICATE OF CORRECTION

PATENT NO. : 6,356,794 B1
DATED : March 12, 2002
INVENTOR(S) : Joseph C. Perin, Jr. and David G. Wagoner It is certified that error appears in the above-identified patent and that said Letters Patent is hereby corrected as shown below:

<u>Column 29,</u>
Line 43, please delete "a fault store for storing which stores" and replace with -- a fault store which stores --.

Signed and Sealed this

Second Day of July, 2002

Attest:

Attesting Officer

JAMES E. ROGAN
*Director of the United States Patent and Trademark Office*